United States Patent [19]

Ebato et al.

[11] Patent Number: 5,403,897
[45] Date of Patent: Apr. 4, 1995

[54] PROCESS FOR PRODUCING LACTIC ACID-BASED COPOLYESTER AND PACKAGING MATERIAL

[75] Inventors: Hiroshi Ebato; Satoshi Oya; Yasutoshi Kakizawa; Hideyuki Furuta; Kosuke Arai, all of Chiba, Japan

[73] Assignee: Dainippon Ink & Chemicals, Inc., Tokyo, Japan

[21] Appl. No.: 217,719

[22] Filed: Mar. 25, 1994

[30] Foreign Application Priority Data

| Mar. 31, 1993 | [JP] | Japan | 5-073462 |
| Mar. 31, 1993 | [JP] | Japan | 5-073465 |
| Mar. 31, 1993 | [JP] | Japan | 5-073468 |
| Oct. 29, 1993 | [JP] | Japan | 5-271928 |
| Dec. 24, 1993 | [JP] | Japan | 5-327068 |

[51] Int. Cl.$^6$ .................... C08F 20/00; B32B 27/36; C08G 63/08
[52] U.S. Cl. .................... 525/444; 428/480; 525/415; 525/437; 525/450; 528/272; 528/308; 528/354
[58] Field of Search ............... 428/480; 525/415, 437, 525/444, 450; 528/272, 308, 354

[56] References Cited

U.S. PATENT DOCUMENTS

| 4,507,444 | 3/1985 | Slawyk et al. | 525/455 |
| 4,654,412 | 3/1987 | Calundann et al. | 528/176 |
| 4,877,682 | 10/1989 | Sauers et al. | 428/412 |
| 5,202,413 | 4/1993 | Spinu | 528/354 |

FOREIGN PATENT DOCUMENTS 0115403  8/1984  European Pat. Off.

OTHER PUBLICATIONS

Derwent Publications Ltd., London, GB; AN 74-16776V, abstract.

Derwent Publications Ltd., London, GB; JP-B-49 006 554 (Mitsubishi Rayon Co., Ltd.) 14 Feb. 1974, abstract.

*Primary Examiner*—John Kight, III
*Assistant Examiner*—Shelley A. Dodson
*Attorney, Agent, or Firm*—Armstrong, Westerman, Hattori, McLeland & Naughton

[57] ABSTRACT

A process for producing a lactic acid-based copolyester by the ring-opening copolymerization and transesterification of a lactide (A) with an aromatic polyester (B) and/or an aliphatic polyester (C) in the presence of a ring-opening polymerization catalyst (D), and a packaging material comprising the lactic acid-based copolyester obtained by the process are disclosed. According to the present invention, a lactic acid-based degradable copolyester which has a sufficiently high molecular weight and satisfactory toughness and also has suitable rigidity, pliability, and transparency according to applications can be produced. Further, a general-purpose packaging material, e.g., a sheet or film, which comprises the lactic acid-based copolyester produced by the process and is excellent in formability, degradability, and transparency can also be produced.

28 Claims, No Drawings

PROCESS FOR PRODUCING LACTIC ACID-BASED COPOLYESTER AND PACKAGING MATERIAL

FIELD OF THE INVENTION

The present invention relates to a process for producing a lactic acid-based copolyester by the ring-opening addition polymerization and transesterification of a lactide with an aromatic polyester, aliphatic polyester, and aromatic/aliphatic polyester, and to a packaging material comprising the lactic acid-based copolyester obtained by the process.

The lactic acid-based copolyester obtained by the present invention can be molded by various techniques, such as extrusion molding, injection molding, inflation molding, laminating, and press molding, using existing devices for use with general-purpose resins. It is useful as a wide variety of packaging materials.

For example, the copolyester is useful in film applications including bags such as garbage bags, bags supplied by stores on purchase, general-purpose standard bags, and heavy-duty bags, packaging materials for, e.g., agricultural use, foods, industrial use, fibers, and other miscellaneous goods, binding tapes, and agricultural multipurpose films, and is also useful as sheets and injection-molded articles including not only agricultural or industrial sheets and sheets for foods but also trays, miscellaneous goods for daily use, food containers, sheets for curing, seedling pots, and industrial materials and parts.

BACKGROUND OF THE INVENTION

In recent years, extensive investigations have been made on the practical use of lactic acid polymers having excellent biodegradability as general-purpose polymers in a wide range of fields from the standpoints of alleviating environmental problems and others, and a large number of investigations and patent applications have been made concerning production processes therefor. However, the conventional polymers of lactic acid or lactide, i.e., poly(lactic acid) and copolymers of lactide and other monomer(s), have insufficient performance with respect to moldability and transparency. In addition, poly(lactic acid) has other problems, for example, that it degrades too quickly in applications other than special ones, so that it is unsuited for use as a general-purpose resin. There has hence been a desire for the development of a novel biodegradable polymer.

In International Publication No. 91/02015 are described a copolymer of an aromatic polyester, such as poly(ethylene terephthalate) or poly(butylene terephthalate), with either polyglycolide or poly(lactic acid) and processes for producing the copolymer.

The processes described are one based on the reaction of monomers in which lactide is reacted with butylene glycol and dimethyl terephthalate and one based on a reaction between polymers in which transesterification is conducted between two polymers, polyglycolide and poly(butylene terephthalate), at a temperature as high as 220° C. However, the processes given in the Examples are limited to the method of transesterification between polymers.

In JP-A-4-504731 is described a process in which lactide is polymerized in the presence of poly(ethylene terephthalate) to produce a polymer blend of poly(lactic acid) and poly(ethylene terephthalate). (The term "JP-A" as used herein means an "unexamined published Japanese patent application".) Further, techniques of reacting a lactone with a crystalline aromatic polyester are described in JP-B-48-4115 and JP-B-48-4116. (The term "JP-B" as used herein means an "examined Japanese patent publication".) In these processes, lactones, in particular ε-caprolactone and γ-valerolactone, are reacted with a crystalline aromatic polyester.

However, the process described in JP-A-4-504731 is defective in that since the softening point of poly(ethylene terephthalate) is 220° C. or above, which is higher than the decomposition temperature, 185° C., of lactide, only a significantly discolored copolymer is obtained whose molecular weight is not high. The processes described in JP-B-48-4115 and JP-B-48-4116, which involve the reaction of a lactone, have problems, for example, that the copolymers obtained are not transparent, have excessive pliability, and are not preferred as a molding resin.

It is thus well known that a sufficiently high molecular weight cannot be attained with the hitherto reported processes for producing the desired polymer from monomers alone, that is, from a dicarboxylic acid component or an ester thereof, a diol component, and a cyclic ester such as lactide. With respect to the process for producing the desired polymer by reaction between polymers, i.e., an aromatic polyester, such as poly(ethylene terephthalate) or poly(butylene terephthalate), and poly(lactic acid), the process is impractical because the decomposition temperature of the latter polymer is far lower than the temperature at which the former polymer becomes flowable.

In addition, the lactic acid-based copolyester obtained is brittle and has poor transparency, which properties are attributable to the crystallinity and high melting temperature of the aromatic polyester and the poor compatibility thereof with other compounds. As a method for producing a copolymer of lactide and an aliphatic polyester, a process is described in JP-A-63-145661 which comprises polymerizing ε-caprolactone beforehand to obtain its homopolymer and block-copolymerizing lactide with the homopolymer.

The process in which lactide is block-copolymerized with poly(ε-caprolactone), however, is disadvantageous in that the copolymer obtained is cloudy and not transparent. The reasons why the copolymer is cloudy may be that in the copolymer the poly(ε-caprolactone) blocks are poorly compatible with the poly(lactic acid) blocks and the aliphatic polyester consisting of the poly(ε-caprolactone) blocks generally has high crystallibility and is pliable at room temperature despite its relatively high glass transition temperature as determined by differential thermal analysis.

To sum up the prior art techniques described above, the conventionally known poly(lactic acid), although excellent in degradability and transparency, not only has had problems that it degrades too quickly and has poor heat resistance, but also has had insufficient moldability for packaging applications such as films and sheets due to the rigidity attributable to the crystallization of lactide.

On the other hand, the conventionally known copolymers of lactic acid have been defective in that they have lower molecular weights than general-purpose non-degradable polymers and do not have transparency or sufficient heat resistance, although the copolymers are degradable. In addition, the copolymers with an aromatic polyester have had insufficient pliability for use as packaging materials such as films and sheets due to the rigidity of lactide.

If the residual lactide monomer is used as a plasticizer as a means for plasticization, there are problems, for example, that the lactide sublimes during the production process and the emitted lactide deposits on the production equipment to foul it, and that the elimination of the lactide as plasticizer from the polymer during storage or use results in disappearance of the plasticizing effect, smearing of the contents in the package, etc.

In the case of incorporating an ordinary plasticizer, it should be used in a large amount in order to attain desired plasticization and this inevitably results in the problem of plasticizer bleeding, with the problems during storage, i.e., disappearance of plasticizing effect during storage, smearing of the contents, etc., being left unsolved. Thus, a polymer usable as a packaging material having fully satisfactory properties has been unable to be obtained.

SUMMARY OF THE INVENTION

An object of the present invention is to provide a process for producing a lactic acid-based degradable copolyester which has a sufficiently high molecular weight and satisfactory toughness and also has suitable rigidity, pliability, and transparency according to applications.

Another object of the invention is to provide a general-purpose packaging material, e.g., a sheet or film, which comprises the lactic acid-based copolyester produced by the process and is excellent in formability, degradability, and transparency.

As a result of intensive studies made by the present inventors in order to attain the above-described objects, they have found that a lactic acid-based copolyester produced by reacting, in the presence of a ring-opening polymerization catalyst, a lactide with a polyester polymer comprising an aliphatic dicarboxylic acid unit and/or aromatic dicarboxylic acid unit and a diol unit in various proportions has good compatibility between the polyester moieties and the poly(lactic acid) moieties and is transparent. They have further found that the copolyester, when produced by copolymerizing a lactide with a hydrophobic polyester, has diminished hydrolyzability in contrast to poly(lactic acid), which is rigid and tends to be subjected to hydrolysis, and that by suitably varying the proportion of the aliphatic dicarboxylic acid unit to the aromatic dicarboxylic acid unit, it is possible to produce a wide variety of internally plasticized polyester polymers ranging from a rigid resin having a high glass transition point and melting point to a soft resin.

It has also been found that a sheet or film which is transparent and has a tensile modulus (1% modulus) of from 500 to 50,000 kg/cm$^2$ and which therefore is suited for use as a packaging material is obtained from the lactic acid-based copolyester described above. The present invention has been completed based on these findings.

The present invention provides a process for producing a lactic acid-based linear copolyester having a weight-average molecular weight of from 20,000 to 400,000, comprising subjecting from 25 to 98 parts by weight of (A) a lactide, from 1 to 70 parts by weight of (B) a linear aromatic polyester containing an aromatic ring, having a weight-average molecular weight of from 10,000 to 250,000, and comprising an aromatic dicarboxylic acid unit and an aliphatic diol unit, and from 1 to 70 parts by weight of (C) a linear aliphatic polyester having a weight-average molecular weight of from 10,000 to 250,000 and comprising an aliphatic dicarboxylic acid unit and an aliphatic diol unit to ring-opening copolymerization and transesterification in the presence of (D) a ring-opening polymerization catalyst.

The present invention includes a process for producing a lactic acid-based linear copolyester having a weight-average molecular weight of from 20,000 to 400,000, comprising subjecting from 50 to 98 parts by weight of (A) a lactide and from 2 to 50 parts by weight of (E) a linear aromatic/aliphatic polyester containing an aromatic ring, having a weight-average molecular weight of from 10,000 to 250,000, and comprising an aromatic dicarboxylic acid unit, an aliphatic dicarboxylic acid unit, and an aliphatic diol unit to ring-opening polymerization and transesterification in the presence of (D) a ring-opening polymerization catalyst.

The present invention further includes:

A process for producing a lactic acid-based linear copolyester having a weight-average molecular weight of from 20,000 to 400,000, comprising subjecting from 50 to 98 parts by weight of (A) a lactide and from 2 to 50 parts by weight of (C) a linear aliphatic polyester having a weight-average molecular weight of from 10,000 to 250,000 and comprising an aliphatic dicarboxylic acid unit and an aliphatic diol unit to ring-opening polymerization and transesterification in the presence of (D) a ring-opening polymerization catalyst;

A process for producing a lactic acid-based linear copolyester having a weight-average molecular weight of from 20,000 to 400,000, comprising subjecting from 50 to 98 parts by weight of (A) a lactide and from 2 to 50 parts by weight of (B) a linear aromatic polyester having a weight-average molecular weight of from 10,000 to 250,000 and comprising an aromatic dicarboxylic acid unit and an aliphatic diol unit to ring-opening polymerization and transesterification in the presence of (D) a ring-opening polymerization catalyst;

A process for producing a lactide-based polyester having a tensile modulus of from 500 to 50,000 kg/cm$^2$, comprising reacting from 25 to 98 parts by weight of a lactide (A) with from 1 to 60 parts by weight of a linear aromatic polyester (B) having a weight-average molecular weight of from 10,000 to 250,000 and comprising an aromatic dicarboxylic acid unit and an aliphatic diol unit and from 1 to 60 parts by weight of a linear aliphatic polyester (C) having a weight-average molecular weight of from 10,000 to 250,000 and comprising an aliphatic dicarboxylic acid unit and an aliphatic diol unit, in the presence of a ring-opening polymerization catalyst (D);

A process for producing a lactide-based polyester having a tensile modulus of from 500 to 50,000 kg/cm$^2$, comprising reacting from 25 to 98 parts by weight of a lactide (A) with from 2 to 75 parts by weight of an aromatic/aliphatic polyester (E) having a weight-average molecular weight of from 10,000 to 250,000 and comprising an aromatic dicarboxylic acid unit, an aliphatic dicarboxylic acid unit, and an aliphatic diol unit, in the presence of a ring-opening polymerization catalyst (D);

A process for producing a lactide-based polyester having a tensile modulus of from 500 to 50,000 kg/cm$^2$, comprising reacting from 25 to 98 parts by weight of a lactide (A) with from 2 to 75 parts by weight of an aliphatic polyester (C) having a weight-average molecular weight of from 10,000 to 250,000 and comprising an aliphatic dicarboxylic acid unit and an aliphatic diol unit, in the presence of a ring-opening polymerization catalyst (D);

A process for producing a lactide-based polyester having a tensile modulus of from 500 to 50,000 kg/cm$^2$, comprising reacting from 25 to 98 parts by weight of a lactide (A) with from 2 to 75 parts by weight of an aromatic polyester (B) having a weight-average molecular weight of from 10,000 to 250,000 and comprising an aromatic dicarboxylic acid unit and an aliphatic diol unit, in the presence of a ring-opening polymerization catalyst (D);

A process for producing a transparent lactide-based polyester, comprising reacting from 25 to 98 parts by weight of a lactide (A) with from 1 to 60 parts by weight of a linear aromatic polyester (B) having a weight-average molecular weight of from 10,000 to 250,000 and comprising an aromatic dicarboxylic acid unit and an aliphatic diol unit and from 2 to 75 parts by weight of a linear aliphatic polyester (C) having a weight-average molecular weight of from 10,000 to 250,000 and comprising an aliphatic dicarboxylic acid unit and an aliphatic diol unit, in the presence of a ring-opening polymerization catalyst (D);

A process for producing a transparent lactide-based polyester, comprising reacting from 25 to 98 parts by weight of a lactide (A) with from 2 to 75 parts by weight of an aromatic/aliphatic polyester (E) having a weight-average molecular weight of from 10,000 to 250,000 and comprising 1 to 40 parts by weight of an aromatic dicarboxylic acid unit, 1 to 40 parts by weight of an aliphatic dicarboxylic acid unit, and 1 to 40 parts by weight of an aliphatic diol unit, in the presence of a ring-opening polymerization catalyst (D);

A process for producing a transparent lactide-based polyester, comprising reacting from 75 to 98 parts by weight of a lactide (A) with from 2 to 25 parts by weight of an aliphatic polyester (C) having a weight-average molecular weight of from 10,000 to 250,000 and comprising an aliphatic dicarboxylic acid unit and an aliphatic diol unit, in the presence of a ring-opening polymerization catalyst (D);

A process for producing a transparent lactide-based polyester, comprising reacting from 75 to 98 parts by weight of a lactide (A) with from 2 to 25 parts by weight of an aromatic polyester (B) having a weight-average molecular weight of from 10,000 to 250,000 and comprising an aromatic dicarboxylic acid unit and an aliphatic diol unit, in the presence of a ring-opening polymerization catalyst (D);

Any of the above-described processes for producing a lactic acid-based copolyester, wherein the linear polyester having a melting point or a softening point the lower of which is not higher than 200° C. is dissolved in the lactide (A) before the ring-opening polymerization and transesterification are conducted;

Any of the above-described processes for producing a lactic acid-based copolyester, wherein the ring-opening polymerization and transesterification are conducted in the presence of a solvent;

Any of the above-described processes for producing a lactic acid-based copolyester, wherein the aromatic dicarboxylic acid unit is one derived from at least one member selected from the group consisting of phthalic acid, isophthalic acid, and terephthalic acid;

Any of the above-described processes for producing a lactic acid-based copolyester, wherein the aliphatic dicarboxylic acid unit is one derived from an aliphatic dicarboxylic acid having from 4 to 14 carbon atoms; and Any of the above-described processes for producing a lactic acid-based copolyester, wherein the aliphatic diol unit is one derived from a diol having from 2 to 10 carbon atoms.

The present invention further includes:

A packaging material comprising as an essential component a lactic acid-based linear copolyester having a weight-average molecular weight of from 20,000 to 400,000 and made up of from 25 to 98% by weight poly(lactic acid) block and from 2 to 75% by weight polyester block consisting of from 10 to 35% by weight aromatic-ring moieties and from 65 to 90% by weight chain-hydrocarbon and/or alicyclic-hydrocarbon moieties containing the group —COO—;

A packaging material comprising as an essential component a lactic acid-based linear copolyester having a weight-average molecular weight of from 20,000 to 400,000 and made up of from 25 to 98% by weight poly(lactic acid) block and from 2 to 75% by weight polyester block consisting of chain-hydrocarbon and/or alicyclic-hydrocarbon moieties containing the group —COO—;

A packaging material comprising a lactic acid-based linear copolyester which is made up of from 25 to 98% by weight poly(lactic acid) block and from 2 to 75% by weight polyester block consisting of from 20 to 35% by weight aromatic-ring moieties and from 65 to 80% by weight chain-hydrocarbon and/or alicyclic-hydrocarbon moieties containing the group —COO—, contains from 0.4 to 28% by weight aromatic rings, and has a weight-average molecular weight of from 100,000 to 400,000 and a tensile modulus of from 15,000 to 50,000 kg/cm$^2$;

A packaging material comprising a lactic acid-based linear copolyester which is made up of from 80 to 98% by weight poly(lactic acid) block and from 2 to 20% by weight polyester block consisting of chain-hydrocarbon and/or alicyclic-hydrocarbon containing the group —COO— and has a weight-average molecular weight of from 100,000 to 400,000 and a tensile modulus of from 15,000 to 50,000 kg/cm$^2$;

A packaging material comprising a lactic acid-based linear copolyester which is made up of from 25 to 98% by weight poly(lactic acid) block and from 2 to 75% by weight polyester block consisting of from 10 to 25% by weight aromatic-ring moieties and from 75 to 90% by weight chain-hydrocarbon and/or alicyclic-hydrocarbon moieties containing the group —COO—, contains from 0.2 to 19% by weight aromatic rings, and has a weight-average molecular weight of from 40,000 to 400,000 and a tensile modulus of from 500 to 20,000 kg/cm$^2$;

A packaging material comprising a lactic acid-based linear copolyester which is made up of from 25 to 95% by weight poly(lactic acid) block and from 5 to 75% by weight polyester block consisting of chain-hydrocarbon and/or alicyclic-hydrocarbon containing the group —COO— and has a weight-average molecular weight of from 40,000 to 400,000 and a tensile modulus of from 500 to 20,000 kg/cm$^2$;

A transparent packaging material comprising a lactic acid-based linear copolyester which is made up of from 75 to 98% by weight poly(lactic acid) block and from 2 to 25% by weight polyester block consisting of from 10 to 35% by weight aromatic-ring moieties and from 65 to 90% by weight chain-hydrocarbon and/or alicyclic-hydrocarbon moieties containing the group —COO—, contains from 0.2 to 9% by weight aromatic rings, and has a weight-average molecular weight of from 100,000 to 400,000 and a tensile modulus of from 15,000 to 50,000 kg/cm$^2$;

A transparent packaging material comprising a lactic acid-based linear copolyester which is made up of from 75 to 98% by weight poly(lactic acid) block and from 2 to 25% by weight polyester block consisting of from 10 to 25% by weight aromatic-ring moieties and from 75 to 90% by weight chain-hydrocarbon and/or alicyclic-hydrocarbon moieties containing the group —COO—, contains from 0.2 to 7% by weight aromatic rings, and has a weight-average molecular weight of from 40,000 to 400,000 and a tensile modulus of from 500 to 20,000 kg/cm$^2$; and A transparent packaging material comprising a lactic acid-based linear copolyester which is made up of from 75 to 98% by weight poly(lactic acid) block and from 2 to 25% by weight polyester block consisting of chain-hydrocarbon and/or alicyclic-hydrocarbon containing the group —COO— and has a weight-average molecular weight of from 40,000 to 400,000 and a tensile modulus of from 500 to 20,000 kg/cm$^2$.

The present invention moreover includes: any of the above-described packaging materials comprising a lactic acid-based linear copolyester, which is either a sheet or a film; and a packaging material of such kind which has been monoaxially or biaxially stretched.

DETAILED DESCRIPTION OF THE INVENTION

The lactide to be used in the present invention is explained below, followed by the polyesters.

The lactide for use in this invention is a compound formed by the cyclic dimerization of lactic acid and includes stereoisomeric monomers. That is, the existing isomers of lactide include L-lactide made up of two molecules of L-lactic acid, D-lactide made up of two molecules of D-lactic acid, and meso-lactide made up of L-lactic acid and D-lactic acid. Lactide copolymers in which the lactide is either L-lactide alone or D-lactide alone crystallize and have high melting points. The lactic acid-based copolyester to be obtained by the present invention can be made to have preferred resin properties by using the three kinds of lactides in combination.

It is preferred that the lactide for use in the present invention be one having an L-lactide content of 75% or higher based on all the lactide isomers for attaining high thermal properties, and be one having L-lactide content of 90% or higher based on all the lactide isomers for attaining higher thermal properties.

The aromatic polyester (B) for use in the present invention means a polyester comprising an aromatic dicarboxylic acid unit and a diol unit. In the case where the aromatic polyester (B) is to be used in a solvent-free molten state in reaction with the lactide, the polyester is not particularly limited as long as it has a melting point or a softening point the lower of which is not higher than 200° C., especially preferably in the range of 80 to 190° C.

General-purpose commercial grades of poly(ethylene terephthalate) usually have softening points of 220 to 255° C. and are mostly unsuited for use in the process of the present invention. However, by synthesizing a special low-softening-point poly(ethylene terephthalate) (softening point: 200° C. or lower) and using it in the copolymer production process of the present invention, a colorless high-molecular copolymer of lactic acid can be obtained which has good properties.

The aromatic polyester (B) to be used in the present invention, therefore, is not particularly limited in its structure. It is however preferred that in order to obtain a high-molecular lactide copolymer, the polyester to be used should have a high molecular weight, specifically in the range of from 10,000 to 250,000 in terms of weight-average molecular weight. For obtaining a high-molecular aromatic polyester, it is preferable that the molar fraction of the amount of the dicarboxylic acid unit to that of the diol unit be almost 1.

Examples of the aromatic dicarboxylic acid unit in the aromatic polyester (B), which unit is not particularly limited, include the units derived from phthalic acid, isophthalic acid, terephthalic acid, naphthalenedicarboxylic acid, phthalic anhydride, and the like. Examples thereof further include the units derived from esters of phthalic acid, isophthalic acid, terephthalic acid, naphthalenedicarboxylic acid, etc. with an alcohol and a diol.

The diol unit in the aromatic polyester is not particularly limited in kind as long as it is one derived from a diol. However, preferred diols are those having 2 to 10 carbon atoms. Specific examples thereof include ethylene glycol, propylene glycol, butylene glycol, pentanediol, hexamethylene glycol, octanediol, neopentyl glycol, cyclohexanedimethanol, xylene glycol, diethylene glycol, triethylene glycol, dipropylene glycol, dibutanediol, 3-hydroxypivalyl pivalate, and hydrogenated bisphenol A.

The lactic acid-based copolyester obtained by the process of the present invention can be a resin with good transparency. It can further have a glass transition point not lower than room temperature, in particular not lower than 45° C., and a melting point of 140° C. or higher. For attaining these properties, the amounts of the ingredients (A) and (B) are preferably such that the (A)/(B) ratio is from 50/50 to 98/2 by weight.

From the lactic acid-based copolyesters, sheets ranging from a high-strength one to a pliable one are obtained. Specifically, sheets having tensile moduli ranging from 500 to 50,000 kg/cm$^2$ are obtained. The test for tensile modulus determination was conducted using a Dynamic mechanical analyzer for solids, DMS 200 manufactured by Seiko Instruments Inc., under conditions of 23° C. and 50% RH.

For the purpose of obtaining a more transparent polymer, it is desirable to use the lactide in a larger proportion. Specifically, the (A)/(B) ratio is preferably from 75/25 to 98/2 by weight.

It is preferred that the lactic acid-based copolyester have a higher molecular weight because such copolyester is moldable in a wider temperature range. Specifically, the desirable range of the molecular weight is from 20,000 to 400,000 in terms of weight-average molecular weight.

The aliphatic polyester (C) to be used in the present invention means a polyester comprising an aliphatic dicarboxylic acid unit and a diol unit, and preferably has a high molecular weight, specifically in the range of from 10,000 to 250,000 in terms of weight-average molecular weight. For obtaining a high-molecular aliphatic polyester, it is preferable that the molar fraction of the amount of the aliphatic dicarboxylic acid unit to that of the diol unit be almost 1.

The amount of the lactide (A) to be used is not particularly limited, but it is preferably from 25 to 98 parts by weight per 100 parts by weight of the sum of the lactide (A) and the aliphatic polyester (C). For obtaining a more transparent resin, the lactide amount is from 75 to 98 parts by weight per 100 parts by weight of the sum of the lactide and the aliphatic polyester.

From the lactic acid-based copolyesters obtained, sheets ranging from a high-strength one to a pliable one can be obtained. Specifically, sheets having tensile moduli ranging from 500 to 50,000 kg/cm$^2$ are obtained. The test for tensile modulus determination was conducted using a Dynamic mechanical analyzer for solids, DMS 200 manufactured by Seiko Instruments Inc., under conditions of 23° C. and 50% RH.

Hereinafter, tensile modulus means the storage modulus determined under these conditions unless otherwise indicated.

Although the aliphatic dicarboxylic acid unit in the aliphatic polyester (C) for use in the present invention is not particularly limited, one derived from an aliphatic dicarboxylic acid having 4 to 14 carbon atoms is especially preferred. Specific examples of such acids include succinic acid, adipic acid, azelaic acid, sebacic acid, brassylic acid, and cyclohexanedicarboxylic acid. Besides these, dimer acids and the like are also usable.

The diol unit is not particularly limited in kind, but one derived from a diol having 2 to 10 carbon atoms is especially preferred. Specific examples of such diols include ethylene glycol, propylene glycol, butylene glycol, pentanediol, hexamethylene glycol, octanediol, neopentyl glycol, cyclohexanedimethanol, xylene glycol, diethylene glycol, triethylene glycol, dipropylene glycol, dibutanediol, 3-hydroxypivalyl pivalate, and hydrogenated bisphenols.

The lactic acid-based copolyester obtained by the process of the present invention can be a resin with good transparency. It can further have a glass transition point not lower than room temperature and a melting point of 140° C. or higher. For attaining these properties, the amounts of the ingredients (A) and (C) are preferably such that the (A)/(C) ratio is from 75/25 to 98/2 by weight.

For obtaining a more transparent polymer, it is preferred that the proportion of the lactide to be used is such that the (A)/(C) ratio is from 85/15 to 98/2 by weight.

It is preferred that the lactic acid-based copolyester have a higher molecular weight because such copolyester is moldable in a wider temperature range. Specifically, the preferred range of the molecular weight is from 20,000 to 400,000 in terms of weight-average molecular weight. From the lactic acid-based copolyesters having molecular weights in that range, sheets ranging from a high-strength one to a pliable one are obtained. Specifically, sheets having tensile moduli ranging from 500 to 50,000 kg/cm$^2$ are obtained.

The aromatic/aliphatic polyester (E) to be used in the present invention means a polyester comprising two kinds of dicarboxylic acid units, i.e., an aromatic dicarboxylic acid unit and an aliphatic dicarboxylic acid unit, and a diol unit. It is preferable that the polyester (E) is a noncrystalline polyester from the standpoint of obtaining a lactic acid-based copolyester having improved transparency.

It is preferred that the molecular weight of the aromatic/aliphatic polyester (E) be high, specifically in the range of from 10,000 to 250,000 in terms of weight-average molecular weight, and that the molar proportion of the amount of the dicarboxylic acid units to that of the diol unit be around 1. Although the ratio of the amount of the aliphatic dicarboxylic acid unit to that of the aromatic dicarboxylic acid unit is not particularly limited, it is preferable that the content of the aliphatic dicarboxylic acid unit in all dicarboxylic acid units be from 10 to 50% by mole.

The aromatic dicarboxylic acid unit in the aromatic/aliphatic polyester (E) is preferably one(s) derived from, e.g., phthalic acid, isophthalic acid, and/or terephthalic acid, and may also be one derived from 2,6-naphthalenedicarboxylic acid. The aliphatic dicarboxylic acid unit is preferably one derived from an aliphatic dicarboxylic acid having 4 to 20 carbon atoms. Specific examples of such acids include succinic acid, adipic acid, azelaic acid, sebacic acid, brassylic acid, and cyclohexanedicarboxylic acid. Besides these, the aliphatic dicarboxylic acid unit may be one derived from a dimer acid or the like.

The diol unit is not particularly limited in kind. Examples thereof include the units derived from ethylene glycol, propylene glycol, butylene glycol, pentanediol, hexamethylene glycol, octanediol, neopentyl glycol, cyclohexanedimethanol, hydrogenated bisphenol A, xylene glycol, diethylene glycol, triethylene glycol, dipropylene glycol, dibutanediol, and 3-hydroxypivalyl pivalate.

Higher melting points and higher glass transition temperatures are attainable due to properties of the poly(lactic acid) moiety having many ester bonds; the lactic acid-based copolyester obtained by the present invention can have a glass transition point not lower than room temperature and a melting point of 160° C. or higher. For attaining these properties, the proportions of the ingredients (A) and (E) are preferably such that the (A)/(E) ratio is from 50/50 to 98/2 by weight. For obtaining better transparency and better thermal properties including a glass transition point of 45° C. or higher, the proportion of the lactide to be used is preferably such that the (A)/(E) ratio is from 85/15 to 95/5 by weight.

It is preferred that the lactic acid-based copolyester have a higher molecular weight because such copolyester is moldable in a wider temperature range. Specifically, the preferred range of the molecular weight is from 20,000 to 400,000 in terms of weight-average molecular weight. From the lactic acid-based copolyesters having molecular weights in that range, sheets ranging from a high-strength one to a pliable one are obtained. Specifically, sheets having tensile moduli ranging from 500 to 50,000 kg/cm$^2$ are obtained.

In the present invention, the aromatic polyester (B) and the aliphatic polyester (C) can be used in combination. In this case also, the weight-average molecular weights of the two polyesters are preferably from 10,000 to 250,000.

Although the ratio of the amount of the aromatic polyester to that of the aliphatic polyester is not limited, it is preferred that for attaining practically sufficient strength, pliability, and transparency, the amount of the lactide be from 50 to 98 parts by weight, that of the aromatic polyester be from 1 to 49 parts by weight, and that of the aliphatic polyester be from 1 to 49 parts by weight per 100 parts by weight of the total amount of the lactide, aromatic polyester, and aliphatic polyester.

The aromatic polyester (B), aliphatic polyester (C), and aromatic/aliphatic polyester (E) to be used in the present invention each is preferably one having a melting point or a softening point the lower of which is not higher than 200° C., especially in the range of from 80° to 190° C. Although the aromatic polyester (B) is not limited in crystallizability or non-crystallizability, it is more desirably a transparent polyester. The values of melting point in the present invention are ones determined by the differential scanning calorimetry (DSC), while those of softening point are ones determined in accordance with JIS-K-2531.

It is desirable that the polymerization reaction be conducted using the ring-opening polymerization catalyst (D). Examples of the ring-opening polymerization catalyst for use in the present invention include such metals as tin, zinc, lead, titanium, bismuth, zirconium, and germanium and derivatives thereof, which are catalysts generally used for the ring-opening polymerization of cyclic esters and are known also as transesterification catalysts. Especially preferred of those derivatives are organometallic compounds, carbonates, oxides, and halides. Specific examples of such preferred derivatives include tin octanoate, tin chloride, zinc chloride, zinc acetate, lead oxide, lead carbonate, titanium chloride, alkoxytitaniums, germanium oxide, and zirconium oxide.

The amount of the ring-opening polymerization catalyst (D) is preferably from 0.01 to 0.2% by weight based on the total amount of the lactide (A) and the aromatic polyester (B), aliphatic polyester (C), and/or aromatic-/aliphatic polyester (E) containing an aromatic dicarboxylic acid unit and an aliphatic dicarboxylic acid unit. From the standpoints of attaining a sufficiently high reaction rate and obtaining a less colored lactic acid-based copolyester, the especially preferred range of the catalyst amount is from 0.02 to 0.1% by weight.

The production process is then explained in the order of steps. The lactide (A) is heated along with the aromatic/aliphatic polyester (E), aromatic polyester (B), aliphatic polyester (C), or a mixture thereof to melt the ingredients. Alternatively, the necessary ingredients are mixed in the presence of a solvent. The ring-opening polymerization catalyst (D) is then added. Use of a reaction temperature not lower than the melting point of the lactide is desirable because at that temperature the reaction system can be homogeneous and a high polymerization rate is obtained.

In the case where the reaction is conducted in a solvent-free system, a reaction temperature not lower than the melting point of the lactide and not higher than 185° C. is desirable from a reaction equilibrium standpoint and from the standpoint that the lactic acid-based copolyester can be prevented from discoloring as a result of a decomposition reaction. Since the melting point of the lactide is around 100° C., the reaction temperature is preferably not lower than 100° C. and not higher than 185° C., more preferably from 145° to 180° C.; this range is desirable from a reaction equilibrium standpoint and from the standpoint that the lactic acid-based copolyester can be prevented from decreasing in molecular weight or discoloring as a result of a decomposition reaction.

It is therefore preferred that the lactide be melted and the polyester to be used in the copolymerization be dissolved in the lactide and reacted. The reaction can be carried out at that temperature, with the polyester being in a molten state or dissolved in the lactide.

An atmosphere suited for the reaction from the standpoint of preventing the decomposition and discoloration of the lactide is a dry inert gas. It is particularly desirable to conduct the reaction in a nitrogen or argon gas atmosphere or with nitrogen or argon gas bubbling. It is also necessary that the raw material to be used with the lactide, i.e., the aromatic/aliphatic polyester (E) containing an aromatic dicarboxylic acid unit and an aliphatic dicarboxylic acid unit, the aromatic polyester (B), the aliphatic polyester (C), or a mixture thereof, should be dehydrated and dried beforehand.

The reaction can also be conducted using a solvent or the like because the lactide can be dissolved in a solvent. Examples of usable solvents include benzene, toluene, ethylbenzene, xylene, cyclohexanone, methyl ethyl ketone, and isopropyl ether.

When the polymerization is followed by GPC, a low-molecular fraction attributable to the aromatic/aliphatic polyester (E), aromatic polyester (B), or aliphatic polyester (C) and a relatively high-molecular fraction attributable to either a copolymer of the lactide (A) or a lactide homopolymer are obtained in the initial stage. As the reaction proceeds, the reaction system comes to give only one fraction having an intermediate molecular weight.

It is thought that in the polymerization reaction, the lactide undergoes ring-opening addition polymerization to form lactide blocks linked to the polyester at its terminal OH groups, thereby giving an A-B-A type block copolymer, and that transesterification between the polymers proceeds besides the polymerization. By sufficiently conducting the transesterification, a lactic acid-based copolyester not containing the homopolymer can be obtained. The lactic acid-based copolyester which is thus produced substantially retains a linear structure throughout the ring-opening polymerization and transesterification.

Although the lactic acid-based copolyester according to the present invention can be produced in an ordinary reaction vessel, the use of an ordinary reaction vessel for the copolymerization reaction is disadvantageous in that mixing and stirring are inhibited by an increase in viscosity with increasing molecular weight and the resulting local heating is apt to cause partial modification. In addition, when the reaction product is taken out of the reaction vessel, not a negligible proportion of the product remains adherent to the vessel wall or to the stirring blades, leading to a decrease in yield.

In general, in such a high-viscosity region that the resin viscosity is above 10,000 P, stirring heat generated by a shearing stress as well as polymerization heat is severe and, hence, dynamic stirring causes considerable local heat generation around the stirring blades. It is therefore preferred to use a static mixer the shearing stress caused by which is small and which applies a shearing force evenly.

In a preferred method, two or more static mixers, usually having a tubular structure, are linearly connected and a feedstock is continuously fed through a feedstock inlet in an inert gas atmosphere to allow the reaction mixture to move through the static mixers continuously. Thus, the reaction can be carried out continuously and the procedures from feedstock introduction to reaction, removal of volatiles, and polymer pelletization can be conducted while the reaction mixture and the reaction product are kept being completely prevented from coming into contact with the surrounding air.

The static mixer herein means a statistically mixing device which has no movable parts, or which does not have any stirrer, in contrast to mixing devices having a stirrer. Illustratively stated, it means a mixing device in which the flow of a reaction mixture is repeatedly divided, deflected, or inverted, in the longitudinal and transverse directions, by mixing elements having no movable parts and fixed to the inner wall of the tube to thereby mix the solution.

Some kinds of static mixers are equipped with a jacket for heat exchange on the outer circumference of the tube, while others have mixing elements which themselves have a heat exchanger tube for passing a heat transfer medium therethrough.

Although the whole polymerization reaction in the process of the present invention for producing a lactic acid-based copolyester can be carried out in only a reactor equipped with a static mixer, it is also possible to conduct the process in such a manner that the initial stage of the reaction in which stage the polymer viscosity is relatively low is performed in a reaction vessel having an ordinary stirrer and the latter half of the reaction in which the polymer viscosity becomes high is performed in a reactor equipped with a static mixer to thereby fully produce the stirring effect of the static mixer during the latter half of the reaction.

For conducting the process in such a manner, a continuous reactor may be used which comprises a reaction vessel of the stirring type and a static mixer connected thereto.

Since the lactide, the polyester polymers, and the lactic acid-based copolyester to be obtained are apt to dissolve in a solvent or the like, the reaction can be conducted using a solvent or the like. Although the lactic acid-based copolyester being produced has a high melting point and a high melt viscosity and is difficult to react, the addition of a solvent serves to decrease the viscosity of the reaction system and facilitate the stirring and reaction.

In particular, in the case of using a continuous polymerizer equipped with a static mixer, the use of a solvent is effective in that the extrusion pressure for sending the solution is lowered and that when the reactor has an internal temperature-control device for passing a heat transfer medium therethrough for temperature control or has a baffle plate for stirring, it can be made more lightly equipped.

Because of easy stirring, temperature control is easy and temperature evenness is attained throughout the reactor, so that a lactic acid-based copolyester of higher quality, with respect to discoloration, etc., can be obtained.

Examples of preferred solvents for use in the reaction include benzene, toluene, ethylbenzene, xylene, cyclohexanone, methyl ethyl ketone, methyl isobutyl ketone, and isopropyl ether. When a solvent is used to conduct the reaction, a lower reaction rate results. For alleviating this, it is preferred to conduct the reaction at a temperature of 165° to 195° C.

If water comes into the reaction system, the polymerization is inhibited and a decomposition reaction is accelerated. It is therefore preferable to perform the reaction in a dry inert gas atmosphere, particularly in a nitrogen or argon gas atmosphere or in an inert gas stream.

It is desirable that removal of volatiles be conducted under a reduced pressure at the latter stage of the polymerization for the purpose of removing the residual lactide, the solvent, and any odorous substance. By this step of volatile removal, the content of residual lactide can be reduced and the storage stability of the lactic acid-based copolyester obtained can be enhanced significantly.

The remaining of the lactide is undesirable in that when the lactic acid-based copolyester is processed into a sheet form, the lactide deposits on the chill roll and the deposit in turn is transferred to the sheet or film to cause spots thereon, and that the lactide is released by sublimation from the film or sheet product to foul the article packaged. It is therefore desirable that the content of the lactide remaining in the lactic acid-based copolyester obtained by the present invention be regulated at 1% by weight or lower.

A preferred technique for the removal of volatiles comprises taking out the copolyester, after polymerization, at a reduced pressure with heating. For preventing the molecular weight of the lactic acid-based copolyester from decreasing, it is preferable to conduct the removal of volatiles under conditions of a volatile-removal time of 2 to 30 minutes, a temperature of 145° to 230° C., and a degree of vacuum of 0.1 to 50 Torr.

In another technique for the removal of volatiles, the lactic acid-based copolyester after polymerization is pelleted or reduced into particles and is then taken out at a reduced pressure with heating.

In this case also, the volatile-removal time, temperature, and degree of vacuum are preferably 15 to 400 minutes, 60° to 200° C., and 0.1 to 50 Torr, respectively, for the purpose of preventing the molecular weight of the lactic acid-based copolyester from decreasing.

Still another technique for the diminution of the residual lactide is a reprecipitation method in which the lactic acid-based copolyester after polymerization is dissolved in a solvent and the solution is added to a poor solvent to recover the polymer. Preferred examples of the solvent in which the lactic acid-based copolyester is to be dissolved include benzene, toluene, ethylbenzene, xylene, cyclohexanone, methyl ethyl ketone, methyl isobutyl ketone, tetrahydrofuran, dioxane, isopropyl ether, dichloromethane, chloroform, carbon tetrachloride, chlorobenzene, dichlorobenzene, trichlorobenzene, chloronaphthalene, and mixtures thereof, in all of which the copolyester is highly soluble. Examples of the poor solvent include water, methanol, ethanol, propanol, butanol, pentane, hexane, heptane, octane, nonane, decane, diethyl ether, and mixtures thereof.

The reprecipitation method preferably comprises dissolving the lactic acid-based copolyester in a solvent at room temperature or with heating at a concentration of 2 to 20% by weight, gradually adding the solution to a 2- to 15-fold amount of a poor solvent with stirring, allowing the resulting mixture to stand for 10 to 180 minutes to cause precipitation, and taking out the precipitate. The precipitate taken out is exposed to a reduced pressure and/or an elevated temperature to remove the residual solvent.

By conducting any of these volatile-removal methods, the lactide remaining usually at a concentration of about 2.5% can be diminished to 1.0% or below, if necessary to 0.1% or below.

In the copolymer production process of the present invention, a cyclic ester other than the lactide (A) can be further added to thereby produce a lactic acid-based copolyester. Also for the purpose of producing a soft copolyester, a lactone can be added in an amount of 1 to 20% by weight to the total amount of copolyester.

The cyclic ester to be added besides the lactide is not particularly limited. Examples thereof include the cyclic dimers of hydroxy acids such as glycolide and intramolecular lactides such as, in particular, ε-caprolactone, γ-valerolactone, and γ-undecalactone. Increasing the amount of such a lactone results in lowered glass transition and melting points and enhanced pliability.

The process of the present invention can provide various lactic acid-based copolyesters ranging from one having high rigidity to one having high pliability.

Specifically, lactic acid-based copolyesters having tensile moduli ranging from 500 to 50,000 kg/cm$^2$ can be provided which have degradability and can be extensively used as useful general-purpose resins such as a resin for packaging materials in, e.g., sheet or film form, foaming resin, extrusion molding resin, injection molding resin, resin for inks, and laminating resin. In particular, the process is useful for producing a polymer for packaging materials.

The lactic acid-based copolyester which constitutes the packaging material of the present invention will then be explained in detail.

The packaging material of the present invention more specifically means a sheet or film for packaging use. The packaging material according to the present invention comprises, as an essential component, a lactic acid-based linear copolyester made up of a poly(lactic acid) block and a polyester block consisting of aromatic-ring moieties and chain-hydrocarbon and/or alicyclic-hydrocarbon moieties containing the group —COO—.

The poly(lactic acid) block herein means a component consisting of lactide units formed by the ring-opening polymerization of a lactide. The polyester block consisting of aromatic-ring moieties and chain-hydrocarbon and/or alicyclic-hydrocarbon moieties containing the group —COO— means the polyester moiety derived from the polyester used as a raw material, and comprises aromatic rings derived from the raw-material aromatic polyester and straight-chain units, which constitute the polyester moiety's parts other than the aromatic rings, i.e., the chain hydrocarbon and/or alicyclic-hydrocarbon moieties containing the group —COO—.

In the case where an aliphatic polyester not containing an aromatic ring was used as the raw-material polyester, the lactic acid-based copolyester in the packaging material of the present invention is made up of a poly(lactic acid) block formed by the ring-opening polymerization of the lactide and a polyester block consisting of chain-hydrocarbon and/or alicyclic-hydrocarbon moieties containing the group —COO—.

The lactic acid-based copolyester for use in the packaging material of the present invention, which is made up of the poly(lactic acid) block and polyester block described above, is a product of block copolymerization and transesterification. In the present invention, a polyester having an aromatic ring is often referred to as an aromatic polyester, while a polyester having no aromatic ring is often referred to as an aliphatic polyester.

The lactic acid-based copolyester according to the present invention can be easily formed into a sheet or film by extrusion molding such as, e.g., T-die cast molding or inflation molding. Although a packaging material in a sheet, film, or other form can be easily produced from the lactic acid-based copolyester with an ordinary single-screw extruder, the control of water content is important because the copolyester has high moisture absorption and is hence subjected to hydrolysis.

The screw may be of the ordinary full-flighted type having an L/D ratio of about from 20 to 30, and may have a vent. In the case of using a single-screw extruder, it is preferred to conduct dehumidification with, e.g., a vacuum dryer to regulate the water content in the feedstock at 50 ppm or lower in order to avoid hydrolysis within the extruder. The proper extrusion temperature varies depending on the molecular weight and residual lactide content of the lactic acid-based copolyester to be used, but is desirably not lower than the temperature at which the copolyester becomes flowable.

In T-die cast molding, the sheet or film extruded is cooled with a mirror plate or textured roll which are usually temperature-controlled. An air-knife may be used for this step. Use of a vented twin-screw extruder is advantageous in that since it has a high dehydrating effect, there is no need of conducting predrying and efficient film formation is possible.

In inflation molding, a sheet or film can be easily formed with an extruder equipped with an ordinary circular die and air ring, without any special attachment device. In this technique, the die, air ring, or winder may be revolved in order to avoid thickness unevenness.

The sheet or film thus formed may be stretched monoaxially or biaxially by the tentering method or inflation method at a temperature not lower than the glass transition temperature and not higher than the melting point. By the stretching treatment, molecular orientation occurs and improvements can be attained in such properties as impact resistance, rigidity, and transparency.

The stretching may be conducted either simultaneously or successively, and the stretching speed is not particularly limited. Although the stretch ratio also is not particularly limited, a stretch ratio of from 2 to 4 is usually effective in both the machine and cross directions in biaxial stretching. In the case where the property of shrinking upon heating is especially required as in a shrinkable film, mono- or biaxial stretching in a stretch ratio as high as from 3 to 6 is preferred.

Improved heat resistance can also be obtained by conducting heat setting immediately after stretching to thereby remove any strain or accelerate crystallization.

In forming a sheet or film, a generally employed filler may be incorporated. Examples of the filler include inorganic fillers such as talc, calcium carbonate, silica, clay, diatomaceous earth, and pearlite and organic fillers such as wood meal.

Further, the thermal stability required for molding can be improved by using a stabilizer. Examples of the stabilizer include antioxidants such as 2,6-di-t-butyl-4-methylphenol (BHT) and butylhydroxyanisole (BHA), ultraviolet absorbers such as salicylic acid derivatives, benzophenone compounds, and benzotriazole compounds, and other compounds including phosphoric esters, isocyanates, and carbodiimide.

The amount of these stabilizers to be added is not particularly limited, but the preferred range thereof is usually from 0.1 to 10% by weight based on the amount of the lactic acid-based copolyester.

Although the lactic acid-based copolyester itself for use in the present invention is sufficiently thermoplastic and has good melt moldability, enhanced pliability may be imparted by adding a plasticizer such as dioctyl adipate, dioctyl sebacate, trioctyl trimellitate, diethyl phthalate, dioctyl phthalate, poly(propylene glycol) adipate, or butanediol adipate. Of these plasticizers, adipic acid-based polyester plasticizers are preferred especially because they have good compatibility and a high plasticizing effect. Particularly preferred are adipic acid-based polyester plasticizers which have weight-average molecular weights of 20,000 or lower and in which the terminals have been blocked with an alcohol or the like, since they show good stability in molding and forming.

The amount of these plasticizers to be added is not particularly limited. However, for the purpose of avoiding bleeding, or the phenomenon in which the excess plasticizer migrates out from the resin, the amount thereof is preferably from 1 to 30% by weight based on the amount of the lactic acid-based copolyester.

Moreover, a metal soap such as zinc stearate, magnesium stearate, or calcium stearate, a lubricant such as a mineral oil, liquid paraffin, or ethylenebisstearamide, a nonionic surfactant such as a fatty acid ester of glycerol or fatty acid ester of sucrose, an ionic surfactant such as an alkylsulfonic acid salt, a colorant such as titanium oxide or carbon black, etc. may also be added without any particular limitation.

A foam may be obtained from the copolyester by adding, e.g., an inorganic foaming agent such as sodium bicarbonate or ammonium bicarbonate or an organic foaming agent such as azodicarbonamide, azobisisobutyronitrile, or a sulfonylhydrazide, or by using a technique in which a foaming agent such as pentane, butane, or a Freon is incorporated beforehand into the copolyester or is fed directly to the extruder during the extrusion procedure.

It is also possible to laminate the copolyester to paper, aluminum foil, or film of other degradable polymer by extrusion laminating, dry laminating, or co-extrusion.

As a technique for the secondary forming of a sheet, vacuum forming, pressure forming, vacuum/pressure forming, or the like may be utilized. The lactic acid-based copolyester produced by the present invention can be molded into a sheet using an existing apparatus for use in producing sheets from general-purpose resins.

In the case of vacuum forming or vacuum/pressure forming, plug-assist forming may be conducted. With respect to a stretched sheet, pressure forming is preferably conducted. In performing these forming techniques, the mold may be optionally heated or cooled. In particular, by heating the mold at a temperature not lower than the crystallization temperature to actively accelerate crystallization, heat resistance can be improved.

With respect to film production, the film can be easily heat-sealed on an ordinary bag-making machine such as a horizontal type or vertical type forming, filling and closing machine for flexible package, a bag-making machine for producing twisted bags, etc., thereby giving bags.

When shaped products other than these sheet or film products are desired, such as containers, an ordinary injection molding machine can be used for this purpose without any difficulty.

Blow molding is also easy, and single-layer or multi-layer bottles can be easily molded using an existing molding machine. By press molding also, single-layer or multilayer products can be obtained without any particular problem.

Application examples of the lactic acid-based copolyester produced by the present invention are given below, but the applications of the copolyester are not limited thereto. Examples of film applications, regardless of whether the films have undergone stretching or not, include bags such as garbage bags, bags supplied by stores on purchase, general-purpose standard bags, and heavy-duty bags, binding tapes, general-purpose packaging films for, e.g., foods, industrial parts, electrical products, textile goods, and other miscellaneous goods, agricultural mulching films, and labels.

Examples of sheet applications include trays, foamed sheets, sheets for curing, and seedling pots, while examples of injection-molded products include miscellaneous goods for daily use, toys, food containers, and industrial materials and parts. Since the lactic acid-based copolyester is superior to poly(lactic acid) particularly in water resistance, it is useful especially for applications where the polymer may come into contact with water, such as food-packaging and agricultural materials.

Examples of other applications include cups, paper packages, cases, and the like which all are produced by extrusion laminating or dry laminating with paper, aluminum foil, other polymer, etc. Examples thereof further include products of the foaming of shapes, such as fish container boxes and cushioning materials, and products of blow molding such as beverage bottles and cleanser bottles.

More specifically, the packaging material of the present invention, which comprises a lactic acid-based copolyester, is a packaging material comprising as an essential component a copolymer of a lactide and an aromatic/aliphatic polyester having both an aromatic dicarboxylic acid unit and an aliphatic dicarboxylic acid unit, the copolymer being a lactic acid-based linear copolyester having a weight-average molecular weight of from 20,000 to 400,000 and made up of from 25 to 98% by weight poly(lactic acid) block and from 2 to 75% by weight polyester block consisting of from 10 to 35% by weight aromatic-ring moieties and from 65 to 90% by weight chain-hydrocarbon and/or alicyclic-hydrocarbon moieties containing the group —COO—.

The packaging material of the present invention, which comprises a lactic acid-based copolyester, includes a packaging material comprising as an essential component a copolymer of a lactide and an aliphatic polyester having as the only acid unit an aliphatic dicarboxylic acid unit, the copolymer being a lactic acid-based linear copolyester having a weight-average molecular weight of from 20,000 to 400,000 and made up of from 25 to 98% by weight poly(lactic acid) block and from 2 to 75% by weight polyester block consisting of chain-hydrocarbon and/or alicyclic-hydrocarbon moieties containing the group —COO—.

Embodiments of the packaging material which have a tensile modulus of 15,000 to 50,000 kg/cm$^2$ include: a packaging material comprising a lactic acid-based linear copolyester which is made up of from 25 to 98% by weight poly(lactic acid) block and from 2 to 75% by weight polyester block consisting of from 20 to 35% by weight aromatic-ring moieties and chain-hydrocarbon and/or alicyclic-hydrocarbon containing the group —COO—, contains from 0.4 to 28% by weight aromatic rings, and has a weight-average molecular weight of from 100,000 to 400,000; and, as an embodiment comprising a copolymer of a lactide and an aliphatic polyester having as the only acid unit an aliphatic dicarboxylic acid unit, a packaging material comprising a lactic acid-based linear copolyester which is made up of from 80 to 98% by weight poly(lactic acid) block and from 2 to 20% by weight polyester block consisting of chain-hydrocarbon and/or alicyclic-hydrocarbon containing the group —COO— and has a weight-average molecular weight of from 100,000 to 400,000.

These high-rigidity packaging materials having a tensile modulus of 15,000 to 50,000 kg/cm$^2$ are especially suitable for use in such applications as sheets and injection-molded articles. The sheets referred to herein mean ones having relatively large thicknesses. Examples of sheet applications include trays, foamed sheets, sheets for curing, and seedling pots, while examples of injection-molded products include miscellaneous goods for daily use, toys, food containers, and industrial materials and parts. Other application examples include products of the foaming of shapes, such as fish container boxes and cushioning materials.

Embodiments of the packaging material which combine high rigidity and transparency include a packaging material comprising a lactic acid-based linear copolyester which is made up of from 75 to 98% by weight poly(lactic acid) block and from 2 to 25% by weight polyester block consisting of from 10 to 35% by weight aromatic-ring moieties and from 65 to 90% by weight chain-hydrocarbon and/or alicyclic-hydrocarbon moieties containing the group —COO—, contains from 0.2 to 9% by weight aromatic rings, and has a weight-average molecular weight of from 100,000 to 400,000.

Embodiments of the packaging material which have high pliability with a tensile modulus of 500 to 20,000 kg/cm$^2$ include: a packaging material comprising a copolymer of a lactide and an aromatic/aliphatic polyester having both an aromatic dicarboxylic acid unit and an aliphatic dicarboxylic acid unit, the copolymer being a lactic acid-based linear copolyester which is made up of from 25 to 98% by weight poly(lactic acid) block and from 2 to 75% by weight polyester block consisting of from 10 to 25% by weight aromatic-ring moieties and chain-hydrocarbon and/or alicyclic-hydrocarbon containing the group —COO—, contains from 0.2 to 19% by weight aromatic rings, and has a weight-average molecular weight of from 40,000 to 400,000; and, as an embodiment comprising a copolymer of a lactide and an aliphatic polyester having as the only acid unit an aliphatic dicarboxylic acid unit, a packaging material comprising a lactic acid-based linear copolyester which is made up of from 25 to 95% by weight poly(lactic acid) block and from 5 to 75% by weight polyester block consisting of chain-hydrocarbon and/or alicyclic-hydrocarbon containing the group —COO— and has a weight-average molecular weight of from 40,000 to 400,000 and a tensile modulus of from 500 to 20,000 kg/cm$^2$.

These highly pliable packaging materials having a tensile modulus of 500 to 20,000 kg/cm$^2$ are especially suitable for film applications. The films referred to herein mean ones having relatively small thicknesses as compared with sheets. Examples of film applications include garbage bags, bags supplied by stores on purchase, general-purpose standard bags, heavy-duty bags, binding tapes, general-purpose packaging films for, e.g., foods, industrial parts, electrical products, textile goods, and other miscellaneous goods, agricultural multipurpose films, and labels.

Examples of laminate applications include cups, paper packages, cases, and the like which all are produced by extrusion laminating or dry laminating with paper, aluminum foil, other polymer, etc.

Embodiments of the packaging material which combine high pliability and transparency include a packaging material comprising a lactic acid-based linear copolyester which is made up of from 75 to 98% by weight poly(lactic acid) block and from 2 to 25% by weight polyester block consisting of from 10 to 25% by weight aromatic-ring moieties and from 75 to 90% by weight chain-hydrocarbon and/or alicyclic-hydrocarbon moieties containing the group —COO—, contains from 0.2 to 7% by weight aromatic rings, and has a weight-average molecular weight of from 40,000 to 400,000; and a packaging material comprising a lactic acid-based linear copolyester which is made up of from 75 to 98% by weight poly(lactic acid) block and from 2 to 25% by weight polyester block consisting of chain-hydrocarbon and/or alicyclic-hydrocarbon containing the group —COO— and has a weight-average molecular weight of from 40,000 to 400,000.

The lactic acid-based copolyester obtained by the present invention has so good biodegradability that even when discarded after being used as a general-purpose resin, packaging material, etc. or discarded from production processes, it contributes to a reduction in waste amount. In particular, even when the copolyester is thrown away into a sea, it undergoes hydrolysis and degradation by microorganisms, etc. In the seawater, the polymer can degrade so readily that within several months the strength of the resin deteriorates to such a degree that the resin no longer retains its original shape.

The present invention will be explained below in more detail by reference to Examples and Comparative Examples. In the examples, all parts are by weight unless otherwise indicated.

EXAMPLE 1

90 Parts of L-lactide was added to 10 parts of an aromatic polyester (25 mol % terephthalic acid unit, 25 mol % isophthalic acid unit, 20 mol % ethylene glycol unit, and 30 mol % neopentyl glycol unit; weight-average molecular weight, 69,500 (number-average molecular weight, 39,400; measured by gel permeation chromatography (hereinafter abbreviated as "GPC") and calculated for standard polystyrene); softening point, 163° C.). The ingredients were melt-mixed at 165° C. for 1 hour in an inert gas atmosphere, and tin octanoate was added as a catalyst in an amount of 200 ppm.

Reaction was then conducted for 8 hours, and the copolymer composition yielded was taken out. The lactic acid-based copolyester obtained was a transparent resin. From results of GPC, the resin was ascertained to be a lactic acid-based copolyester having a weight-average molecular weight of 127,800, which was higher than that of the raw-material aromatic polyester.

The GPC analysis gave a single peak, indicating that the copolymer was the only one reaction product. Of the lactide monomer, 2.7% remained. This lactic acid-based copolyester was subjected to differential scanning calorimetry (hereinafter abbreviated as "DSC"), which revealed that it had a glass transition point of 52.7° C. and a melting point of 176.5° C.

EXAMPLE 2

90 Parts of L-lactide was added to 10 parts of an aromatic polyester (30 mol % terephthalic acid unit, 20 mol % isophthalic acid unit, 20 mol % ethylene glycol unit, and 30 mol % bisphenol A diethylene glycol ether unit; weight-average molecular weight, 71,800 (number-average molecular weight, 54,200; calculated for standard polystyrene); softening point, 180° C.). The ingredients were melt-mixed at 165° C. for 1 hour in an inert gas atmosphere, and tin octanoate was added as a catalyst in an amount of 200 ppm.

Reaction was then conducted for 8 hours, and the transparent brown copolymer composition yielded was taken out. From results of GPC, the copolymer was ascertained to be a lactic acid-based copolyester having a weight-average molecular weight of 248,600. The GPC analysis gave a single peak, indicating that the copolymer was the only one reaction product. Of the lactide monomer, 2.9% remained. This copolymer was subjected to DSC, which revealed that it had a glass transition point of 53.7° C. and a melting point of 176.1° C.

EXAMPLE 3

81 Parts of L-lactide and 9 parts of meso-lactide were added to 10 parts of an aromatic polyester (30 mol % terephthalic acid unit, 20 mol % isophthalic acid unit, 20 mol % ethylene glycol unit, and 30 mol % bisphenol A diethylene glycol ether unit; weight-average molecular weight, 71,800 (number-average molecular weight, 54,200; calculated for standard polystyrene); softening point, 180° C.). The ingredients were melt-mixed at 165° C. for 1 hour in an inert gas atmosphere, and tin octanoate was added as a catalyst in an amount of 200 ppm. Reaction was then conducted for 8 hours.

The lactic acid-based copolyester obtained was a transparent brown resin. From results of GPC, the resin was ascertained to be a lactic acid-based copolyester having a weight-average molecular weight of 136,400. Of the lactide monomers, 3.1% remained. This lactic acid-based copolyester was subjected to DSC, which revealed that it had a glass transition point of 50.6° C. and a melting point of 147.1° C.

EXAMPLE 4

81 Parts of L-lactide and 9 parts of meso-lactide were added to 10 parts of an aromatic polyester (25 mol % terephthalic acid unit, 25 mol % isophthalic acid unit, 20 mol % ethylene glycol unit, and 30 mol % neopentyl glycol unit; weight-average molecular weight, 69,500 (number-average molecular weight, 39,400; calculated for standard polystyrene); softening point, 163° C.). The ingredients were melt-mixed at 165° C. for 1 hour in an inert gas atmosphere, and tin octanoate was added as a catalyst in an amount of 200 ppm. Reaction was then conducted for 8 hours.

The lactic acid-based copolyester obtained was a transparent yellow resin. From results of GPC, the resin was ascertained to be a lactic acid-based copolyester having a weight-average molecular weight of 104,600. Of the lactide monomers, 6.8% remained. This lactic acid-based copolyester was subjected to DSC, which revealed that it had a glass transition point of 44.2° C. and a melting point of 141.2° C.

EXAMPLE 5

90 Parts of L-lactide was added to 10 parts of an aromatic polyester (50 mol % terephthalic acid unit and 50 mol % ethylene glycol unit; weight-average molecular weight, 30,600 (number-average molecular weight, 18,300; calculated for standard polystyrene); melting point, 86° C.). The ingredients were mixed at 165° C. for 1 hour in an inert gas atmosphere, and tin octanoate was added as a catalyst in an amount of 200 ppm. Reaction was then conducted for 8 hours.

It was ascertained from results of GPC that a lactic acid-based copolyester having a weight-average molecular weight of 55,400 had been yielded. The copolyester had a glass transition point of 53.5° C. and a melting point of 171.8° C. Thus, a colorless, lactic acid-based copolyester was obtained.

EXAMPLE 6

90 Parts of L-lactide was added to 10 parts of an aromatic polyester (50 mol % terephthalic acid unit and 50 mol % propylene glycol unit; weight-average molecular weight, 11,000 (number-average molecular weight, 6,740; calculated for standard polystyrene); melting point, 84° C.). The ingredients were mixed at 165° C. for 1 hour in an inert gas atmosphere, and tin octanoate was added as a catalyst in an amount of 200 ppm. Reaction was then conducted for 5 hours. It was ascertained from results of GPC that a lactic acid-based copolyester having a weight-average molecular weight of 40,400 had been yielded. Thus, a highly transparent, lactic acid-based copolyester was obtained.

EXAMPLE 7

78 Parts of L-lactide and 7 parts of meso-lactide were added to 15 parts of an aliphatic polyester (50 mol % succinic acid unit and 50 mol % ethylene glycol unit; glass transition point, −3.5° C.; melting point, 105.0° C.). The ingredients were mixed at 165° C. for 1 hour in an inert gas atmosphere, and tin octanoate was added as a catalyst in an amount of 200 ppm. Reaction was then conducted for 8 hours.

The reaction was followed by GPC. It was ascertained as a result that the reaction mixture at first gave a fraction attributable to the aliphatic polyester, one attributable to lactide homopolymer, and one attributable to a copolymer and, with the progress of transesterification, gradually came to give one fraction.

The lactic acid-based copolyester obtained was a transparent brown resin. From results of GPC, the resin was ascertained to be a lactic acid-based copolyester having a weight-average molecular weight of 71,300.

Of the lactide monomers, 12% remained. This lactic acid-based copolyester was subjected to DSC, which revealed that it had a glass transition point of 31.5° C. and a melting point of 97.7° C.

EXAMPLE 8

90 Parts of L-lactide was added to 10 parts of an aliphatic polyester (50 mol % succinic acid unit, 25 mol % ethylene glycol unit, and 25 mol % butylene glycol unit; weight-average molecular weight, 77,000; glass transition point, −2.5° C.; melting point, 83.0° C.). The ingredients were melt-mixed at 165° C. for 1 hour in an inert gas atmosphere, and tin octanoate was added as a catalyst in an amount of 200 ppm.

Reaction was then conducted for 8 hours, and the transparent copolymer composition yielded was taken out. From results of GPC, the copolymer was ascertained to be a lactic acid-based copolyester having a weight-average molecular weight of 182,700. The GPC analysis gave a single peak, indicating that the copolymer was the only one reaction product. Of the lactide monomer, 3.8% remained. This copolymer was subjected to DSC, which revealed that it had a glass transition point of 49.1° C. and a melting point of 169.2° C.

EXAMPLE 9

90 Parts of L-lactide was added to 10 parts of an aliphatic polyester (50 mol % succinic acid unit and 50 mol % ethylene glycol unit; glass transition point, −3.5° C.; melting point, 105.0° C.). The ingredients were melt-mixed at 165° C. for 1 hour in an inert gas atmosphere, and tin octanoate was added as a catalyst in an amount of 200 ppm.

Reaction was then conducted for 8 hours, and the light-brown transparent copolymer composition yielded was taken out. From results of GPC, the copolymer was ascertained to be a lactic acid-based copolyester having a weight-average molecular weight of 141,900. The GPC analysis gave a single peak, indicating that the copolymer was the only one reaction product. Of the lactide monomer, 4.6% remained. This lactic acid-based copolyester was subjected to DSC, which revealed that it had a glass transition point of 43.7° C. and a melting point of 166.3° C.

EXAMPLE 10

90 Parts of L-lactide and 5 parts of D-lactide were added to 5 parts of an aliphatic polyester (50 mol % succinic acid unit and 50 mol % ethylene glycol unit; glass transition point, −3.5° C.; melting point, 105.0° C.). The ingredients were mixed at 165° C. for 1 hour in an inert gas atmosphere, and tin octanoate was added as a catalyst in an amount of 200 ppm. Reaction was then conducted for 8 hours.

The lactic acid-based copolyester obtained was a transparent brown resin. From results of GPC, the resin was ascertained to be a lactic acid-based copolyester having a weight-average molecular weight of 101,700. Of the lactide monomers, 4.0% remained. This copolyester had a glass transition point of 46.9° C. and a melting point of 147.0° C.

EXAMPLE 11

71 Parts of L-lactide and 4 parts of D-lactide were added to 25 parts of an aliphatic polyester (50 mol % succinic acid unit and 50 mol % ethylene glycol unit; glass transition point, −3.5° C.; melting point, 105.0° C.). The ingredients were melt-mixed at 165° C. for 1 hour in an inert gas atmosphere, and tin octanoate was added as a catalyst in an amount of 200 ppm. Reaction was then conducted for 8 hours.

The lactic acid-based copolyester obtained was a transparent brown resin. The residual lactide monomer amount was almost zero. This lactic acid-based copolyester was subjected to DSC, which revealed that it had a glass transition point of 36.5° C. and a melting point of 145.0° C.

EXAMPLE 12

24 Parts of L-lactide and 1 part by weight of D-lactide were added to 75 parts of an aliphatic polyester (50 mol % succinic acid unit and 50 mol % ethylene glycol unit; glass transition point, −3.5° C.; melting point, 105.0° C.). The ingredients were melt-mixed at 165° C. for 1 hour in an inert gas atmosphere, and tin octanoate was added as a catalyst in an amount of 100 ppm. Reaction was then conducted for 8 hours.

The lactic acid-based copolyester obtained was a transparent brown copolymer. Of the lactide monomers, 4.1% remained. This lactic acid-based copolyester was subjected to DSC, which revealed that it had a melting point of 95.0° C.

EXAMPLE 13

82 Parts of L-lactide and 8 parts of D-lactide were added to 10 parts of an aliphatic polyester (50 mol % sebacic acid unit and 50 mol % propylene glycol unit; weight-average molecular weight, 13,100). The ingredients were melt-mixed at 165° C. for 1 hour in an inert gas atmosphere, and tin octanoate was added as a catalyst in an amount of 200 ppm. Reaction was then conducted for 8 hours.

The lactic acid-based copolyester obtained was a transparent brown copolymer. From results of GPC, the copolymer was ascertained to be a lactic acid-based copolyester having a weight-average molecular weight of 56,600. Of the lactide monomers, 3.1% remained. This lactic acid-based copolyester was subjected to DSC, which revealed that it had a glass transition point of 39.4° C. and a melting point of 145.4° C.

EXAMPLE 14

82 Parts of L-lactide and 8 parts of D-lactide were added to 10 parts of an aliphatic polyester (50 mol % succinic acid unit and 50 mol % cyclohexanedimethanol; weight-average molecular weight, 55,800; glass transition point, −3.2° C.). The ingredients were melt-mixed at 165° C. for 1 hour in an inert gas atmosphere, and tin octanoate was added as a catalyst in an amount of 200 ppm. Reaction was then conducted for 8 hours.

The lactic acid-based copolyester obtained was a transparent brown copolymer. From results of GPC, the copolymer was ascertained to be a lactic acid-based copolyester having a weight-average molecular weight of 123,500. Of the lactide monomers, 3.0% remained. This lactic acid-based copolyester was subjected to DSC, which revealed that it had a glass transition point of 48.1° C. and a melting point of 146.6° C.

EXAMPLE 15

72 Parts of L-lactide, 8 parts of meso-lactide, and 10 parts of ε-caprolactone were added to 10 parts of an aliphatic polyester (50 mol % succinic acid unit and 50 mol % ethylene glycol unit; glass transition point, −3.5° C.; melting point, 105.0° C.). The ingredients were mixed at 165° C. for 1 hour in an inert gas atmosphere, and tin octanoate was added as a catalyst in an amount of 200 ppm. Reaction was then conducted for 8 hours.

From results of GPC, the transparent lactic acid-based copolyester obtained was ascertained to have a weight-average molecular weight of 82,500. The GPC analysis gave a single peak, indicating that the copolymer was the only one reaction product. Of the lactide monomers, 4.0% remained. This copolymer had a melting point of 91.3° C.

EXAMPLE 16

90 Parts of L-lactide was added to 10 parts of an aliphatic polyester (50 mol % succinic acid unit and 50 mol % ethylene glycol unit; crosslinked with urethane Pandex P-870 (NCO equivalent, 1,400), manufactured by Dainippon Ink & Chemicals, Inc.; weight-average molecular weight, 234,000). The atmosphere was replaced with an inert gas, and the ingredients were melt-mixed at 165° C. for 1 hour. Tin octanoate was added as a catalyst in an amount of 200 ppm.

Reaction was then conducted for 8 hours, and the transparent brown copolymer composition yielded was taken out. The residual lactide monomer content was almost zero. This lactic acid-based copolyester was subjected to DSC, which revealed that it had a glass transition point of 38.6° C. and a melting point of 149.1° C.

EXAMPLE 17

90 Parts of L-lactide was added to 10 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 52,100 (number-average molecular weight, 19,800; calculated for standard polystyrene)). The ingredients were melt-mixed at 165° C. for 1 hour in an inert gas atmosphere, and 0.02 part of tin octanoate was added as a catalyst.

The reaction was followed by GPC. As a result, the reaction mixture at first gave a low-molecular fraction attributable to the polyester and a fraction attributable to a copolymer but, with the progress of the reaction, came to give a single fraction having an intermediate molecular weight, showing that transesterification was occurring. The reaction was conducted for 8 hours and the resulting copolymer was taken out.

The lactic acid-based copolyester obtained was a light-yellow transparent resin. From results of GPC, the resin was ascertained to be a lactic acid-based copolyester having a weight-average molecular weight of 160,400, which was higher than that of the raw-material polyester containing aromatic dicarboxylic acid units and an aliphatic dicarboxylic acid unit.

After the 8-hour reaction, the reaction mixture gave a single fraction, which was attributable to the copolymer, showing that the copolymer was the only one reaction product. Of the lactide monomer, 2.8% remained. This lactic acid-based copolyester was subjected to DSC, which revealed that it had a glass transition point of 54.1° C. and a melting point of 175.0° C. The copolymer was further subjected to structural analysis by $^{13}C$ nuclear magnetic resonance spectroscopy (hereinafter abbreviated as "NMR"). Major parts of the results obtained are given below.

$^{13}C$ NMR Spectrum ($CD_2Cl_2$ solution; unit, ppm) 69.0–70.1 (absorption assigned to the methine group in the lactic acid unit), 129.6–131.0 (absorption assigned to the carbon atoms of the phenyl rings in the aromatic dicarboxylic acid units), 33.6–33.8 (absorption assigned to the methylene groups in the aliphatic dicarboxylic acid unit which are at the α-positions to the carbonyls), 62.0–63.2 (absorption assigned to the oxygen-bonded methylene groups in the diol units).

EXAMPLE 18

90 Parts of L-lactide was added to 10 parts of a polyester containing an aromatic dicarboxylic acid unit and an aliphatic dicarboxylic acid unit (33 mol % terephthalic acid unit, 17 mol % adipic acid unit, 23 mol % ethylene glycol unit, and 27 mol % neopentyl glycol unit; weight-average molecular weight, 49,000 (number-average molecular weight, 26,700; calculated for standard polystyrene)). The ingredients were melt-mixed at 165° C. for 1 hour in an inert gas atmosphere, and 0.02 part of tin octanoate was added as a catalyst. Reaction was then conducted for 8 hours, and the copolymer yielded was taken out.

From results of GPC, the copolymer was ascertained to be a lactic acid-based copolyester having a weight-average molecular weight of 201,200. The GPC analysis gave a single peak in a high-molecular region, which peak was assigned to the lactic acid-based copolyester, indicating that the copolymer was the only one reaction product. Of the lactide monomer, 2.9% remained. This copolymer was subjected to DSC, which revealed that it had a glass transition point of 54.3° C. and a melting point of 173.2° C. As a result of $^{13}C$ NMR spectroscopy, the copolymer gave a spectrum having absorption peaks at the same positions as in Example 17.

EXAMPLE 19

90 Parts of L-lactide was added to 10 parts of a polyester containing aromatic dicarboxylic acid units and an aliphatic dicarboxylic acid unit (19 mol % terephthalic acid unit, 23 mol % isophthalic acid unit, 8 mol % sebacic acid unit, 22 mol % ethylene glycol unit, and 28 mol % neopentyl glycol unit; weight-average molecular weight, 39,400 (number-average molecular weight, 20,000; calculated for standard polystyrene)). The ingredients were melt-mixed at 165° C. for 1 hour in an inert gas atmosphere, and 0.02 part of tin octanoate was added as a catalyst. Reaction was then conducted for 8 hours. The lactic acid-based copolyester obtained was a transparent colorless resin.

From results of GPC, the resin was ascertained to be a lactic acid-based copolyester having a weight-average molecular weight of 152,600. The GPC analysis gave a single peak in a high-molecular region, which peak was assigned to the lactic acid-based copolyester, indicating that the copolymer was the only one reaction product. Of the lactide monomer, 2.6% remained. This lactic acid-based copolyester was subjected to DSC, which revealed that it had a glass transition point of 52.5° C. and a melting point of 174.0° C. As a result of $^{13}C$ NMR spectroscopy, the copolymer gave a spectrum having absorption peaks at the same positions as in Example 17.

EXAMPLE 20

97.5 Parts of L-lactide was added to 2.5 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were melt-mixed at 165° C. for 1 hour in an inert gas atmosphere, and 0.02 part of tin octanoate was added as a catalyst. Reaction was then conducted for 8 hours.

The lactic acid-based copolyester obtained was a transparent colorless resin. The resin was ascertained to be a lactic acid-based copolyester having a weight-average molecular weight of 244,000. The GPC analysis gave a single peak in a high-molecular region, which peak was assigned to the lactic acid-based copolyester, indicating that the copolymer was the only one reaction product. Of the lactide monomer, 4.4% remained. This copolymer had a glass transition point of 49.7° C. and a melting point of 173.4° C. As a result of $^{13}C$ NMR spectroscopy, the copolymer gave a spectrum having absorption peaks at the same positions as in Example 17.

EXAMPLE 21

90 Parts of L-lactide was added to 10 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were melt-mixed at 165° C. for 1 hour in an inert gas atmosphere, and 0.02 part of tin octanoate was added as a catalyst. Reaction was then conducted for 5 hours. Thereafter stirring was continued for 3 hours at a reduced pressure (3–8 mmHg) to remove the residual monomer. The resin obtained was transparent and colorless.

The resin was ascertained to be a lactic acid-based copolyester having a weight-average molecular weight of 154,200. The GPC analysis gave a single peak in a high-molecular region, which peak was assigned to the lactic acid-based copolyester, indicating that the copolymer was the only one reaction product. Of the lactide monomer, 0.78% remained. This copolymer had a glass transition point of 49.7° C. and a melting point of 171.8° C. As a result of NMR spectroscopy, the copolymer gave a spectrum having absorption peaks at the same positions as in Example 17.

EXAMPLE 22

45 Parts of L-lactide and 45 parts of D-lactide were added to 10 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were mixed at 165° C. for 1 hour in an inert gas atmosphere, and 0.02 part of tin octanoate was added as a catalyst. Reaction was then conducted for 8 hours.

The reaction was followed by GPC. As a result, the reaction mixture at first gave a low-molecular fraction attributable to the polyester and a fraction attributable to a copolymer but, with the progress of the reaction, came to give a single fraction having an intermediate molecular weight, showing that transesterification was occurring.

From results of GPC, the reaction product thus obtained was ascertained to be a lactic acid-based copolyester having a weight-average molecular weight of 101,700.

The GPC analysis gave a single peak in a high-molecular region, which peak was assigned to the lactic acid-based copolyester, indicating that the copolymer was the only one reaction product. Of the lactide monomers, 3.1% remained. This copolymer had a glass transition point of 44.4° C. and a melting point of 149.0° C. As a result of $^{13}$C NMR spectroscopy, the copolymer gave a spectrum having absorption peaks at the same positions as in Example 17.

EXAMPLE 23

76 Parts of L-lactide, 4 parts of meso-lactide, and 10 parts of ε-caprolactone were added to 10 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were mixed at 165° C. for 1 hour in an inert gas atmosphere, and 0.02 part of tin octanoate was added as a catalyst. Reaction was then conducted for 8 hours.

From results of GPC, the reaction product thus obtained was ascertained to be a lactic acid-based copolyester having a weight-average molecular weight of 97,000. The GPC analysis gave a single peak, which was assigned to the lactic acid-based copolyester, indicating that the copolymer was the only one reaction product. This copolymer had a glass transition point of 33.4° C. and a melting point of 142.8° C. As a result of $^{13}$C NMR spectroscopy, the copolymer gave a spectrum having absorption peaks at the same positions as in Example 17.

EXAMPLE 24

99.0 Parts of L-lactide was added to 1.0 part of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were melt-mixed at 165° C. for 1 hour in an inert gas atmosphere, and 0.02 part of tin octanoate was added as a catalyst. Reaction was then conducted for 8 hours. The lactic acid-based copolyester obtained was a transparent colorless resin.

The resin was ascertained to be a lactic acid-based copolyester having a weight-average molecular weight of 351,900. The GPC analysis gave a single peak, which was assigned to the lactic acid-based copolyester, indicating that the copolymer was the only one reaction product. Of the lactide monomer, 4.9% remained. This copolymer had a glass transition point of 50.8° C. and a melting point of 174.5° C. As a result of $^{13}$C NMR spectroscopy, the copolymer gave a spectrum having absorption peaks at the same positions as in Example 17.

EXAMPLE 25

50 Parts of L-lactide was added to 50 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were melt-mixed at 165° C. for 1 hour in an inert gas atmosphere, and 0.02 part of tin octanoate was added as a catalyst. Reaction was then conducted for 8 hours.

The lactic acid-based copolyester obtained was a transparent colorless resin. The resin was ascertained to be a lactic acid-based copolyester having a weight-average molecular weight of 45,000. The GPC analysis gave a single peak in a high-molecular region, which peak was assigned to the lactic acid-based copolyester, indicating that the copolymer was the only one reaction product. Of the lactide monomer, 3.7% remained. This copolymer had a glass transition point of 41.2° C. and a melting point of 162.0° C. As a result of $^{13}$C NMR spectroscopy, the copolymer gave a spectrum having absorption peaks at the same positions as in Example 17.

EXAMPLE 26

25 Parts of L-lactide was added to 75 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). The ingredients were melt-mixed at 165° C. for 1 hour in an inert gas atmosphere, and 0.02 part of tin octanoate was added as a catalyst. Reaction was then conducted for 8 hours. The lactic acid-based copolyester obtained was a transparent colorless resin.

The resin was ascertained to be a lactic acid-based copolyester having a weight-average molecular weight of 38,700. The GPC analysis gave a single peak, which was assigned to the lactic acid-based copolyester, indicating that the copolymer was the only one reaction product. Of the lactide monomer, 2.5% remained. This copolymer had a glass transition point of 41.7° C. and a melting point of 156.2° C. As a result of $^{13}$C NMR spectroscopy, the copolymer gave a spectrum having absorption peaks at the same positions as in Example 17.

EXAMPLE 27

Polymerization was conducted using a 20-L flask equipped with an anchor blade made of 304 stainless steel. 79 Parts of L-lactide and 2 parts of D-lactide were added to 4 parts of a polyester containing aromatic dicarboxylic acid units and an aliphatic dicarboxylic acid unit (14 mol % terephthalic acid unit, 16 mol % isophthalic acid unit, 20 mol % adipic acid unit, 28 mol % ethylene glycol unit, and 22 mol % neopentyl glycol unit; weight-average molecular weight, 45,800 (number-average molecular weight, 19,800; calculated for standard polystyrene)). Thereto was further added 15 parts of toluene as a solvent. The ingredients were melt-mixed at 100° C. for 1 hour in an inert gas atmosphere, and 0.02 part of tin octanoate was added as a catalyst. Reaction was conducted at 165° C. for 1 hour and then at 175° C. for 3.5 hours.

When the reaction was completed, the lactic acid-based copolyester was sampled and found to be a transparent colorless resin. The lactic acid-based copolyester was ascertained to be a lactide/polyester copolymer having a weight-average molecular weight of 196,000. The GPC analysis gave a single peak, indicating that the copolymer was the only one reaction product. This solution resulting from the polymerization was introduced, by means of a thermally insulated gear pump for high-viscosity liquids, into a device comprising a heat exchanger, a devolatilizer for removing volatiles, etc. to remove volatiles. The temperature of the heat exchanger before the devolatilizer was 230° C. and the degree of vacuum in the devolatilizer was 4 to 8 Torr.

The lactic acid-based copolyester obtained was pelleted and examined for various properties. From results of GPC, the lactic acid-based copolyester was ascertained to have a weight-average molecular weight of 181,000 and it was found that 0.4% of the lactide monomers remained but toluene was not detected. The copolymer had a melting point of 168.98° C. Thus, a transparent colorless lactic acid-based copolyester was obtained.

Using a hot press, pellets of the lactic acid-based copolyester were formed into a 100 μm-thick sheet with areal dimensions of 10 cm by 10 cm. The sheet was immersed in a seawater at 35° C. to perform a biodegradation test. The results obtained are shown in Table 1.

TABLE 1

| Immersion period | Weight-average molecular weight | Appearance |
| --- | --- | --- |
| 0 day | 176,300 | rigid, transparent |
| 10 days | 146,800 | rigid, translucent |
| 20 days | 90,800 | brittle, white |
| 30 days | 60,200 | brittle, white |

EXAMPLE 28

A continuous polymerizer was used which had a polymerization zone consisting of a circulatory polymerization line comprising a circulating gear pump and four static mixers which each had an inner diameter of 0.5 inch and a length of 60 cm and which were connected in series and another polymerization line disposed after and connected to the circulatory polymerization line and comprising four static mixers (manufactured by Noritake Co., Ltd., Japan; having 15 built-in mixing elements) which each had an inner diameter of ⅜ inch and a length of 50 cm and which were connected in series.

A catalyst was fed with a catalyst feed pump, and mixed, just before a main-feedstock feed pump, with the main feedstock by means of a static mixer having an inner diameter of ¼ inch and a length of 15.5 cm (manufactured by Noritake Co., Ltd.; having 12 built-in mixing elements).

Continuous polymerization was conducted under the conditions specified below using a main-feedstock solution prepared in a nitrogen gas atmosphere which solution consisted of 85 parts of L-lactide, 5 parts of D-lactide, and 10 parts of an aliphatic polyester (50 mol % succinic acid unit and 50 mol % ethylene glycol unit; weight-average molecular weight, 70,000) and using 0.04 part of tetraisopropyl titanate as a catalyst.

| Main-feedstock feed rate | 400 ml/hr |
| --- | --- |
| Catalyst feed rate | 1.6 ml/hr |
| Reaction temperature | 175° C. |
| Circulation rate in the circulatory polymerization line | 2 l/hr |
| Reflux ratio | 5 |

This solution resulting from the polymerization was introduced, with a thermally insulated gear pump for high-viscosity liquids, into a device comprising a heat exchanger, a devolatilizer for removing volatiles, etc. to remove volatiles. The temperature of the heat exchanger before the devolatilizer was 230° C. and the degree of vacuum in the devolatilizer was 4 to 10 Torr. The lactic acid-based copolyester obtained, which was a transparent yellow resin, was pelleted and then examined for various properties.

From results of GPC, the lactic acid-based copolyester was ascertained to have a weight-average molecular weight of 162,000. The copolymer had a melting point of 166.2° C.

A 200 μm-thick film was formed on a hot press, and its tensile modulus was measured and found to be 12,000 kg/cm².

Using a hot press, pellets of the lactic acid-based copolyester were formed into a 100 μm-thick sheet with areal dimensions of 10 cm by 10 cm. The sheet was immersed in a seawater at 35° C. to perform a biodegradation test. The results obtained are shown in Table 2.

TABLE 2

| Immersion period | Weight-average molecular weight | Appearance |
| --- | --- | --- |
| 0 day | 155,900 | rigid, transparent |
| 10 days | 123,500 | rigid, translucent |
| 20 days | 88,300 | brittle, white |
| 30 days | 57,100 | brittle, white |

EXAMPLE 29

A semi-continuous polymerizer was used which comprised the Continuous polymerizer used in Example 28 and a first reactor (21) equipped with an anchor-form stirring blade, the first reactor being connected to the continuous polymerizer so that the reaction mixture in the first reactor was able to be continuously fed from the outlet at the reactor bottom to the continuous polymerizer by means of a gear pump.

Polymerization was conducted under the conditions specified below using a main-feedstock solution prepared in a nitrogen gas atmosphere which solution consisted of 90 parts of L-lactide, 5 parts of meso-lactide, and 5 parts of poly(ethylene terephthalate) (weight-average molecular weight, 18,300) and using 0.03 part of tin octanoate as a catalyst.

| | |
| --- | --- |
| Main-feedstock feed rate | 500 ml/hr |
| Catalyst feed rate | 1.5 ml/hr |
| Amount of reaction mixture residing in the first reactor | 500 mL |
| Temperature in the first reactor | 160° C. |
| Rate of feeding to the static mixers | 500 mL/hr |
| Temperature in the static mixers | 175° C. |

The lactic acid-based copolyester obtained was pelleted and then examined for various properties. From results of GPC, the lactic acid-based copolyester was ascertained to have a weight-average molecular weight of 165,000. The copolymer had a melting point of 170.2° C. Thus, a transparent colorless lactic acid-based copolyester was obtained. A 200 μm-thick film was formed using a hot press, and its tensile modulus was measured and found to be 18,000 kg/cm².

EXAMPLE 30

The pellets obtained in Example 28 were sufficiently dried and extruded from an extruder having an L/D ratio of 24 and a screw diameter of 50 mm (manufactured by Tanabe Plastics Machinery Co., Ltd.) under conditions of an extrusion temperature of 190° C. to thereby obtain a 1.0 mm-thick sheet having excellent transparency. The extrusion conditions included a screw revolution speed of 44 rpm, discharge rate of 25 kg/hr, back pressure of 148 kg/cm², and drawing speed of 1.3 m/min.

The sheet obtained was examined for molecular weight and further subjected to a tensile test for determining the tensile modulus, tensile strength, and tensile elongation in accordance with JIS-K-7127 after being cut into strip-form test pieces, and also to a measurement of haze in accordance with JIS-K-7105.

The results obtained are summarized in Table 3, which show that the polymer was able to be easily formed into a sheet using an ordinary extruder and the sheet obtained had good thermal stability with little molecular weight decrease and was excellent in transparency, tensile strength, and rigidity.

EXAMPLE 31

A 0.15 mm-thick sheet was formed from the same material at the same temperature as in Example 30. In the preparation of sheet sample, the screw revolution speed was 24 rpm, discharge rate 16 kg/hr, back pressure 86 kg/cm², and drawing speed 6.0 m/min. The sheet was examined for tensile modulus, tensile strength, tensile elongation, and haze by the same methods as in Example 30. It was further examined for Elmendorf tear strength and folding endurance.

The results obtained are summarized in Table 3. The Elmendorf tear strength was determined in accordance with JIS-K-7128 and the value thereof is given in terms of strength per 16-ply sheet. The folding endurance was determined as follows. The sheet was first bent at an angle of 180° and the resulting crease was squeezed with an edge-rounded metal piece, and this sheet was then folded reversely to an angle of 360° and squeezed likewise. This procedure was repeated until the crease developed a crack, and the number of such folding procedure conducted until then was taken as the folding endurance. It was also possible to easily form a thin sheet from the polymer using an ordinary extruder.

EXAMPLE 32

A 0.03 mm-thick film was formed as a sample from the same material at the same temperature as in Example 30. In the sampling, the screw revolution speed was 24 rpm, discharge rate 16 kg/hr, back pressure 86 kg/cm², and drawing speed 30.0 m/min. The film was examined for tensile modulus, tensile strength, tensile elongation, and haze by the same methods as in Example 30. The results obtained are summarized in Table 3. Thus, the polymer was also able to be easily formed into a film using an ordinary extruder.

TABLE 3

| Item | Unit | Example 30 | Example 31 | Example 32 |
| --- | --- | --- | --- | --- |
| Weight-average molecular weight | ×10³ | 152 | 151 | 151 |
| Haze | % | 1.5 | 1.0 | 0.7 |
| Tensile strength at break | kg/cm² | 530 | 550 | 570 |
| Tensile modulus | ×10³ kg/cm² | 24.5 | 25.5 | 25.9 |
| Tensile elongation | % | 2.9 | 2.2 | 1.9 |
| Elmendorf tear strength | g | — | 80 | — |
| Folding endurance | — | — | 7 | — |

EXAMPLE 33

The 1.0 mm-thick, lactic acid-based copolyester sheet obtained in Example 30 was cut into squares each having dimensions of 12 cm by 12 cm and then examined for stretchability by successively stretching the sheet using a biaxial stretching machine (manufactured by Iwamoto Seisakusho K.K., Japan) at a chuck distance of 10 cm, stretching temperature of 50° to 110° C., and stretching speed of 600 %/min. Stretching in the machine direction and stretching in the cross direction were conducted in the same stretch ratios, which varied from 2 to 6. The stretchability was evaluated in three grades.

That is, samples which broke before being stretched are shown by "C", ones which were unable to be evenly stretched although free from breakage are shown by "B", and ones which were able to be stretched satisfactorily are shown by "A". The results obtained are summarized in Table 4. The temperature range in which this sheet was satisfactorily stretchable was as large as from 60° to 90° C., with the maximum stretch ratio at 70° C. being as high as 6×6.

TABLE 4

| Stretching Temperature | 2 × 2 | 3 × 3 | 4 × 4 | 5 × 5 | 6 × 6 |
|---|---|---|---|---|---|
| 50° C. | C | C | C | C | C |
| 60° C. | A | A | A | C | C |
| 70° C. | A | A | A | A | A |
| 80° C. | A | A | A | C | C |
| 90° C. | A | A | C | C | C |
| 100° C. | B | B | C | C | C |
| 110° C. | B | C | C | C | C |
| 120° C. | C | C | C | C | C |

Of the resulting samples, the 0.1 mm-thick samples obtained by 3×3 stretching at 60° C., 70° C., and 80° C. were subjected to a measurement of orientation relaxation stress for examining molecular orientation in accordance with ASTM D-1504 and were further examined for tensile modulus, tensile strength, tensile elongation, and haze. The results obtained are summarized in Table 5, wherein MD means the machine direction and CD means the cross direction. By increasing the orientation relaxation stress, samples having improved rigidity and strength and retaining intact transparency could be obtained.

TABLE 5

| Test Method | Direction | Unit | Stretching Temperature | | |
|---|---|---|---|---|---|
| | | | 60° C. | 70° C. | 80° C. |
| Orientation relaxation stress | MD | kg/cm$^2$ | >20 | 6.4 | 2.8 |
| | CD | | >20 | 8.0 | 4.2 |
| Tensile strength at break | MD | kg/cm$^2$ | 850 | 700 | 590 |
| | CD | | 920 | 740 | 640 |
| Tensile modulus | MD | ×10$^3$ | 36.0 | 29.4 | 28.1 |
| | CD | kg/cm$^2$ | 38.2 | 32.8 | 29.4 |
| Tensile elongation | MD | % | 2.3 | 2.4 | 1.8 |
| | CD | | 2.6 | 2.3 | 3.2 |
| Haze | | % | 0.9 | 1.1 | 1.1 |

EXAMPLE 34

A polyester plasticizer made up of adipic acid unit and 1,3-butanediol unit was added, in amounts of 10% and 20% to the pellets obtained in Example 28, to the same material as that used in Example 30. The resulting mixtures each was kneaded in a kneader having an L/D ratio of 10 (manufactured by Kurimoto Ltd., Japan) at a kneading temperature of 160° C. and then pelleted with a pelletizer. The pelleted resins each was formed into a film using the same apparatus as in Example 30 at an extrusion temperature of 180° C.

The 0.03 nun-thick films obtained were examined for properties by the same methods as in Example 30. The results obtained are summarized in Table 6. As apparent from the results, the plasticized polymers according to the present invention gave transparent, highly pliable films.

TABLE 6

| Item | Unit | Example 33 | |
|---|---|---|---|
| Amount of plasticizer | % | 10 | 20 |
| Haze | % | 1.2 | 1.1 |
| Tensile strength at break | kg/cm$^2$ | 290 | 240 |
| Tensile modulus | ×10$^3$ kg/cm$^2$ | 11.4 | 10.1 |

TABLE 6-continued

| Item | Unit | Example 33 | |
|---|---|---|---|
| Tensile elongation | % | 160 | 200 |

EXAMPLE 35

The 0.03 mm-thick film obtained in Example 32 and that obtained in Example 34 and containing 10% plasticizer were subjected to a heat sealing test using a heat sealer (manufactured by Tester Sangyo K.K., Japan) under conditions of a heating time of 1 second and a pressure with heating of 3 kg/cm$^2$. The results obtained are summarized in Table 7. As apparent from the results, strengths sufficient for bag making were obtained at the sealing temperatures not lower than 90° C.

TABLE 7

| | Sealing temperature (°C.) | | | | |
|---|---|---|---|---|---|
| | 70 | 80 | 90 | 100 | 110 |
| Film of Example 32 (g/15 mm) | 50 | 400 | 1200 | 1700 | 1700 |
| Film of Example 34 (g/15 mm) | 40 | 300 | 1100 | 1400 | 1400 |

EXAMPLE 36

The 0.15 mm-thick sheet obtained in Example 31 was subjected to forming with a vacuum forming machine (manufactured by Sanwa Kogyo K.K., Japan) under conditions of a heating time of 5 seconds, forming/cooling time of 5 seconds, and release time of 1 second to form dish tray covers. As a result, formed products excellent in conformity to the mold shape and in transparency could be obtained.

EXAMPLE 37

The sample obtained by 3×3 stretching at 70° C. in Example 33 was subjected to forming with an air-pressure forming machine under conditions of a pressure with heating of 1.0 kg/cm$^2$, forming pressure of 3.0 kg/cm$^2$, forming time of 1.5 seconds, mold temperature of 40° C., and heating-plate temperature of 90° C. to form dish tray covers of the same shape and size as in Example 36. As a result, formed products having good conformity to the mold shape could be obtained.

COMPARATIVE EXAMPLE 1

To 90 parts of poly(ethylene terephthalate) (in sheet form) were added 10 parts of poly(lactic acid) and 0.02 part of tin octanoate. The atmosphere was replaced with an inert gas and reaction was conducted at 220° C. for 3 hours. During the reaction, the poly(lactic acid) melted and assumed a deep brown color, while the poly(ethylene terephthalate) only softened slightly. This reaction failed to yield a copolymer.

COMPARATIVE EXAMPLE 2

To 10 parts of poly(ethylene terephthalate) (weight-average molecular weight, 18,300) were added 10 parts of ε-caprolactone and 0.02 part of tin octanoate. The atmosphere was replaced with an inert gas and reaction was conducted at 165° C. for 8 hours. As a result, a copolymer having a weight-average molecular weight of 45,800 was obtained, which was an opaque white resin.

COMPARATIVE EXAMPLE 3

Poly(lactic acid) having a weight-average molecular weight of 160,000 (manufactured by Pulac Inc.) was formed into a 0.15 mm-thick sheet using the same extruder and conditions as in Example 31. This sheet was examined for tensile strength, tensile modulus, tensile elongation, haze, Elmendorf tear strength, and folding endurance by the same methods as in Example 31. The results obtained are summarized in Table 8.

A comparison between those examination results and the results in Example 31 show that the sheet according to the present invention has pliability with a lower tensile modulus than the poly(lactic acid), and that as a result of the improved pliability, it further has enhanced toughness with improved tear strength and folding endurance, in which properties the poly(lactic acid) is defective.

TABLE 8

| Item | Unit | Comparative Example 3 |
| --- | --- | --- |
| Weight-average molecular weight | ×10³ | 150 |
| Haze | % | 1.9 |
| Tensile strength at break | kg/cm² | 580 |
| Tensile modulus | ×10³ kg/cm² | 32.8 |
| Tensile elongation | % | 2.0 |
| Elmendorb tear strength | g | 50 |
| Folding endurance | — | 2 |

The present invention can provide a process for producing a degradable, lactic acid-based copolyester which has sufficiently high molecular weight and toughness and further has adequate rigidity, pliability, and transparency according to applications, and also provide a general-purpose packaging material, e.g., a sheet or film, which comprises the lactic acid-based copolyester produced by the above process and is excellent in formability, degradability, and transparency.

While the invention has been described in detail and with reference to specific embodiments thereof, it will be apparent to one skilled in the art that various changes and modifications can be made therein without departing from the spirit and scope thereof.

What is claimed is:

1. A process for producing a lactic acid-based linear copolyester having a weight-average molecular weight of from 20,000 to 400,000, comprising subjecting from 25 to 98 parts by weight of (A) a lactide, from 1 to 70 parts by weight of (B) a linear aromatic polyester containing an aromatic ring, having a weight-average molecular weight of from 10,000 to 250,000, and comprising an aromatic dicarboxylic acid unit and an aliphatic diol unit, and from 1 to 70 parts by weight of (C) a linear aliphatic polyester having a weight-average molecular weight of from 10,000 to 250,000 and comprising an aliphatic dicarboxylic acid unit and an aliphatic diol unit to ring-opening copolymerization and transesterification in the presence of (D) a ring-opening polymerization catalyst.

2. A process for producing a lactic acid-based linear copolyester having a weight-average molecular weight of from 20,000 to 400,000, comprising subjecting from 25 to 98 parts by weight of (A) a lactide and from 2 to 75 parts by weight of (E) a linear aromatic/aliphatic polyester containing an aromatic ring, having a weight-average molecular weight of from 10,000 to 250,000, and comprising an aromatic dicarboxylic acid unit, an aliphatic dicarboxylic acid unit, and an aliphatic diol unit to ring-opening polymerization and transesterification in the presence of (D) a ring-opening polymerization catalyst.

3. A process for producing a lactic acid-based linear copolyester having a weight-average molecular weight of from 20,000 to 400,000, comprising subjecting from 50 to 98 parts by weight of (A) a lactide and from 2 to 50 parts by weight of (C) a linear aliphatic polyester having a weight-average molecular weight of from 10,000 to 250,000 and comprising an aliphatic dicarboxylic acid unit and an aliphatic diol unit to ring-opening polymerization and transesterification in the presence of (D) a ring-opening polymerization catalyst.

4. A process for producing a lactic acid-based linear copolyester having a weight-average molecular weight of from 20,000 to 400,000, comprising subjecting from 50 to 98 parts by weight of (A) a lactide and from 2 to 50 parts by weight of (B) a linear aromatic polyester having a weight-average molecular weight of from 10,000 to 250,000 and comprising an aromatic dicarboxylic acid unit and an aliphatic diol unit to ring-opening polymerization and transesterification in the presence of (D) a ring-opening polymerization catalyst.

5. A process for producing a lactide-based polyester having a tensile modulus of from 500 to 50,000 kg/cm², comprising reacting from 25 to 98 parts by weight of a lactide (A) with from 1 to 60 parts by weight of a linear aromatic polyester (B) having a weight-average molecular weight of from 10,000 to 250,000 and comprising an aromatic dicarboxylic acid unit and an aliphatic diol unit and from 1 to 60 parts by weight of a linear aliphatic polyester (C) having a weight-average molecular weight of from 10,000 to 250,000 and comprising an aliphatic dicarboxylic acid unit and an aliphatic diol unit, in the presence of a ring-opening polymerization catalyst (D).

6. A process for producing a lactide-based polyester having a tensile modulus of from 500 to 50,000 kg/cm², comprising reacting from 25 to 98 parts by weight of a lactide (A) with from 2 to 75 parts by weight of an aromatic/aliphatic polyester (E) having a weight-average molecular weight of from 10,000 to 250,000 and comprising an aromatic dicarboxylic acid unit, an aliphatic dicarboxylic acid unit, and an aliphatic diol unit, in the presence of a ring-opening polymerization catalyst (D).

7. A process for producing a lactide-based polyester having a tensile modulus of from 500 to 50,000 kg/cm², comprising reacting from 25 to 98 parts by weight of a lactide (A) with from 2 to 75 parts by weight of an aliphatic polyester (C) having a weight-average molecular weight of from 10,000 to 250,000 and comprising an aliphatic dicarboxylic acid unit and an aliphatic diol unit, in the presence of a ring-opening polymerization catalyst (D).

8. A process for producing a lactide-based polyester having a tensile modulus of from 500 to 50,000 kg/cm², comprising reacting from 25 to 98 parts by weight of a lactide (A) with from 2 to 75 parts by weight of an aromatic polyester (B) having a weight-average molecular weight of from 10,000 to 250,000 and comprising an aromatic dicarboxylic acid unit and an aliphatic diol unit, in the presence of a ring-opening polymerization catalyst (D).

9. A process for producing a transparent lactide-based polyester, comprising reacting from 25 to 98 parts by weight of a lactide (A) with from 1 to 60 parts by weight of a linear aromatic polyester (B) having a weight-average molecular weight of from 10,000 to 250,000 and comprising an aromatic dicarboxylic acid unit and an aliphatic diol unit and from 2 to 75 parts by weight of a linear aliphatic polyester (C) having a weight-average molecular weight of from 10,000 to 250,000 and comprising an aliphatic dicarboxylic acid unit and an aliphatic diol unit, in the presence of a ring-opening polymerization catalyst (D).

10. A process for producing a transparent lactide-based polyester, comprising reacting from 25 to 98 parts by weight of a lactide (A) with from 2 to 75 parts by weight of an aromatic/aliphatic polyester (E) having a weight-average molecular weight of from 10,000 to 250,000 and comprising 1 to 40 parts by weight of an aromatic dicarboxylic acid unit, 1 to 40 parts by weight of an aliphatic dicarboxylic acid unit, and 1 to 40 parts by weight of an aliphatic diol unit, in the presence of a ring-opening polymerization catalyst (D).

11. A process for producing a transparent lactide-based polyester, comprising reacting from 75 to 98 parts by weight of a lactide (A) with from 2 to 25 parts by weight of an aliphatic polyester (C) having a weight-average molecular weight of from 10,000 to 250,000 and comprising an aliphatic dicarboxylic acid unit and an aliphatic diol unit, in the presence of a ring-opening polymerization catalyst (D).

12. A process for producing a transparent lactide-based polyester, comprising reacting from 75 to 98 parts by weight of a lactide (A) with from 2 to 25 parts by weight of an aromatic polyester (B) having a weight-average molecular weight of from 10,000 to 250,000 and comprising an aromatic dicarboxylic acid unit and an aliphatic diol unit, in the presence of a ring-opening polymerization catalyst (D).

13. The process as claimed in any one of claims 1 to 12, wherein the linear polyester having a melting point or a softening point the lower of which is not higher than 200° C. is dissolved in the lactide (A) before the ring-opening polymerization and transesterification are conducted.

14. The process as claimed in any one of claims 1 to 12, wherein the ring-opening polymerization and transesterification are conducted in the presence of a solvent.

15. The process as claimed in any one of claims 1, 2, 4, 5, 6, 8, 9, 10, and 12, wherein the aromatic dicarboxylic acid unit is one derived from at least one member selected from the group consisting of phthalic acid, isophthalic acid, and terephthalic acid.

16. The process as claimed in any one of claims 1, 2, 3, 5, 6, 7, 9, 10, and 11, wherein the aliphatic dicarboxylic acid unit is one derived from an aliphatic dicarboxylic acid having from 4 to 14 carbon atoms.

17. The process as claimed in any one of claims 1 to 12, wherein the aliphatic diol unit is one derived from a diol having from 2 to 10 carbon atoms.

18. A packaging material comprising as an essential component a lactic acid-based linear copolyester having a weight-average molecular weight of from 20,000 to 400,000 and made up of from 25 to 98% by weight poly(lactic acid) block and from 2 to 75% by weight polyester block consisting of from 10 to 35% by weight aromatic-ring moieties and from 65 to 90% by weight chain-hydrocarbon and/or alicyclic-hydrocarbon moieties containing the group —COO—.

19. A packaging material comprising as an essential component a lactic acid-based linear copolyester having a weight-average molecular weight of from 20,000 to 400,000 and made up of from 25 to 98% by weight poly(lactic acid) block and from 2 to 75% by weight polyester block consisting of chain-hydrocarbon and/or alicyclic-hydrocarbon moieties containing the group —COO—.

20. A packaging material comprising a lactic acid-based linear copolyester which is made up of from 25 to 98% by weight poly(lactic acid) block and from 2 to 75% by weight polyester block consisting of from 20 to 35% by weight aromatic-ring moieties and from 65 to 80% by weight chain-hydrocarbon and/or alicyclic-hydrocarbon moieties containing the group —COO—, contains from 0.4 to 28% by weight aromatic rings, and has a weight-average molecular weight of from 100,000 to 400,000 and a tensile modulus of from 15,000 to 50,000 kg/cm$^2$.

21. A packaging material comprising a lactic acid-based linear copolyester which is made up of from 80 to 98% by weight poly(lactic acid) block and from 2 to 20% by weight polyester block consisting of chain-hydrocarbon and/or alicyclic-hydrocarbon containing the group —COO— and has a weight-average molecular weight of from 100,000 to 400,000 and a tensile modulus of from 15,000 to 50,000 kg/cm$^2$.

22. A packaging material comprising a lactic acid-based linear copolyester which is made up of from 25 to 98% by weight poly(lactic acid) block and from 2 to 75% by weight polyester block consisting of from 10 to 25% by weight aromatic-ring moieties and from 75 to 90% by weight chain-hydrocarbon and/or alicyclic-hydrocarbon moieties containing the group —COO—, contains from 0.2 to 19% by weight aromatic rings, and has a weight-average molecular weight of from 40,000 to 400,000 and a tensile modulus of from 500 to 20,000 kg/cm$^2$.

23. A packaging material comprising a lactic acid-based linear copolyester which is made up of from 25 to 95% by weight poly(lactic acid) block and from 5 to 75% by weight polyester block consisting of chain-hydrocarbon and/or alicyclic-hydrocarbon containing the group —COO— and has a weight-average molecular weight of from 40,000 to 400,000 and a tensile modulus of from 500 to 20,000 kg/cm$^2$.

24. A transparent packaging material comprising a lactic acid-based linear copolyester which is made up of from 75 to 98% by weight poly(lactic acid) block and from 2 to 25% by weight polyester block consisting of from 10 to 35% by weight aromatic-ring moieties and from 65 to 90% by weight chain-hydrocarbon and/or alicyclic-hydrocarbon moieties containing the group —COO—, contains from 0.2 to 9% by weight aromatic rings, and has a weight-average molecular weight of from 100,000 to 400,000 and a tensile modulus of from 15,000 to 50,000 kg/cm$^2$.

25. A transparent packaging material comprising a lactic acid-based linear copolyester which is made up of from 75 to 98% by weight poly(lactic acid) block and from 2 to 25% by weight polyester block consisting of from 10 to 25% by weight aromatic-ring moieties and from 75 to 90% by weight chain-hydrocarbon and/or alicyclic-hydrocarbon moieties containing the group —COO—, contains from 0.2 to 7% by weight aromatic rings, and has a weight-average molecular weight of from 40,000 to 400,000 and a tensile modulus of from 500 to 20,000 kg/cm$^2$.

26. A transparent packaging material comprising a lactic acid-based linear copolyester which is made up of from 75 to 98% by weight poly(lactic acid) block and from 2 to 25% by weight polyester block consisting of chain-hydrocarbon and/or alicyclic-hydrocarbon containing the group —COO— and has a weight-average molecular weight of from 40,000 to 400,000 and a tensile modulus of from 500 to 20,000 kg/cm$^2$.

27. The packaging material as claimed in any one of claims 18 to 26 which is either a sheet or a film.

28. The packaging material as claimed in claim 27, which is a monoaxially or biaxially stretched sheet or film.

* * * * *